United States Patent [19]

Breu

[11] Patent Number: 5,258,101
[45] Date of Patent: Nov. 2, 1993

[54] PYROLYTIC CONVERSION SYSTEM

[75] Inventor: Fred A. Breu, Canton, Ohio

[73] Assignee: Wayne Technology Corp., Rochester, N.Y.

[21] Appl. No.: 775,169

[22] Filed: Oct. 11, 1991

Related U.S. Application Data

[63] Continuation-in-part of Ser. No. 494,256, Mar. 14, 1990, Pat. No. 5,082,534.

[51] Int. Cl.$^5$ .............................................. C10B 1/06
[52] U.S. Cl. ................................. 202/131; 202/136; 202/268; 432/251
[58] Field of Search ............... 202/268, 100, 131, 136, 202/216, 218, 270; 432/251, 103; 211/209

[56] References Cited

U.S. PATENT DOCUMENTS

| | | |
|---|---|---|
| 1,171,583 | 2/1916 | Benson . |
| 1,236,885 | 8/1917 | Seaman . |
| 2,697,068 | 12/1954 | Poindexter . |
| 3,097,834 | 7/1963 | Hurst .................................. 432/103 |
| 3,098,458 | 7/1963 | Lantz . |
| 3,401,924 | 7/1963 | Hurst .................................. 432/103 |
| 3,787,292 | 1/1974 | Keappler . |
| 3,801,469 | 4/1974 | Essenhigh . |
| 3,980,439 | 9/1976 | Moyer . |
| 4,038,152 | 7/1977 | Atkins . |
| 4,038,184 | 7/1977 | Swanteson . |
| 4,064,018 | 12/1977 | Choi . |
| 4,102,773 | 7/1978 | Green . |
| 4,126,519 | 11/1978 | Murray . |
| 4,145,274 | 3/1979 | Green . |
| 4,153,514 | 5/1979 | Garrett . |
| 4,243,489 | 1/1981 | Green . |
| 4,284,616 | 8/1981 | Solbakken . |
| 4,401,513 | 8/1983 | Brewer . |
| 4,404,086 | 9/1983 | Oltrogge . |
| 4,412,889 | 11/1983 | Oeck . |
| 4,463,203 | 7/1984 | Gi . |
| 4,507,174 | 3/1985 | Kutrieb . |
| 4,588,477 | 5/1986 | Habib . |
| 4,647,443 | 3/1987 | Apffel . |
| 4,648,328 | 3/1987 | Keough . |
| 4,868,007 | 8/1987 | Lyakhevich . |

FOREIGN PATENT DOCUMENTS

| | | |
|---|---|---|
| 324668 | 7/1989 | European Pat. Off. . |
| 638576 | 11/1936 | Fed. Rep. of Germany . |
| 2810838 | 10/1979 | Fed. Rep. of Germany . |
| 8802284 | 4/1988 | PCT Int'l Appl. . |
| 146287 | 9/1921 | United Kingdom . |

Primary Examiner—Joye L. Woodard
Attorney, Agent, or Firm—M. Lukacher

[57] ABSTRACT

A pyrolytic converter utilizing a rotatable drum surrounded by an outer drum support structure and disposed in an oven chamber pyrolyzes materials including plastic waste, tires, materials from automobile shredding operations, containers and trays of plastic material, rubber, leather, garbage, sewage sludge, coal, oil shale, broken asphalt and the like. These materials are formed into cartridges by a compactor using a reciprocating ram which forms cartridges in an injection tube wherein another ram injects the cartridges into the converter drum. The converter is disposed on a fulcrum near the injection end thereof while the discharge end is suspended by cables to accommodate thermal expansion of the converter. Cables also suspend collection and separation apparatus having water filled chutes, into one of which the products of pyrolyzation of low density (char) and solids of higher density are discharged from the converter drum. Lower and higher density solids are separately collected tanks.

16 Claims, 19 Drawing Sheets

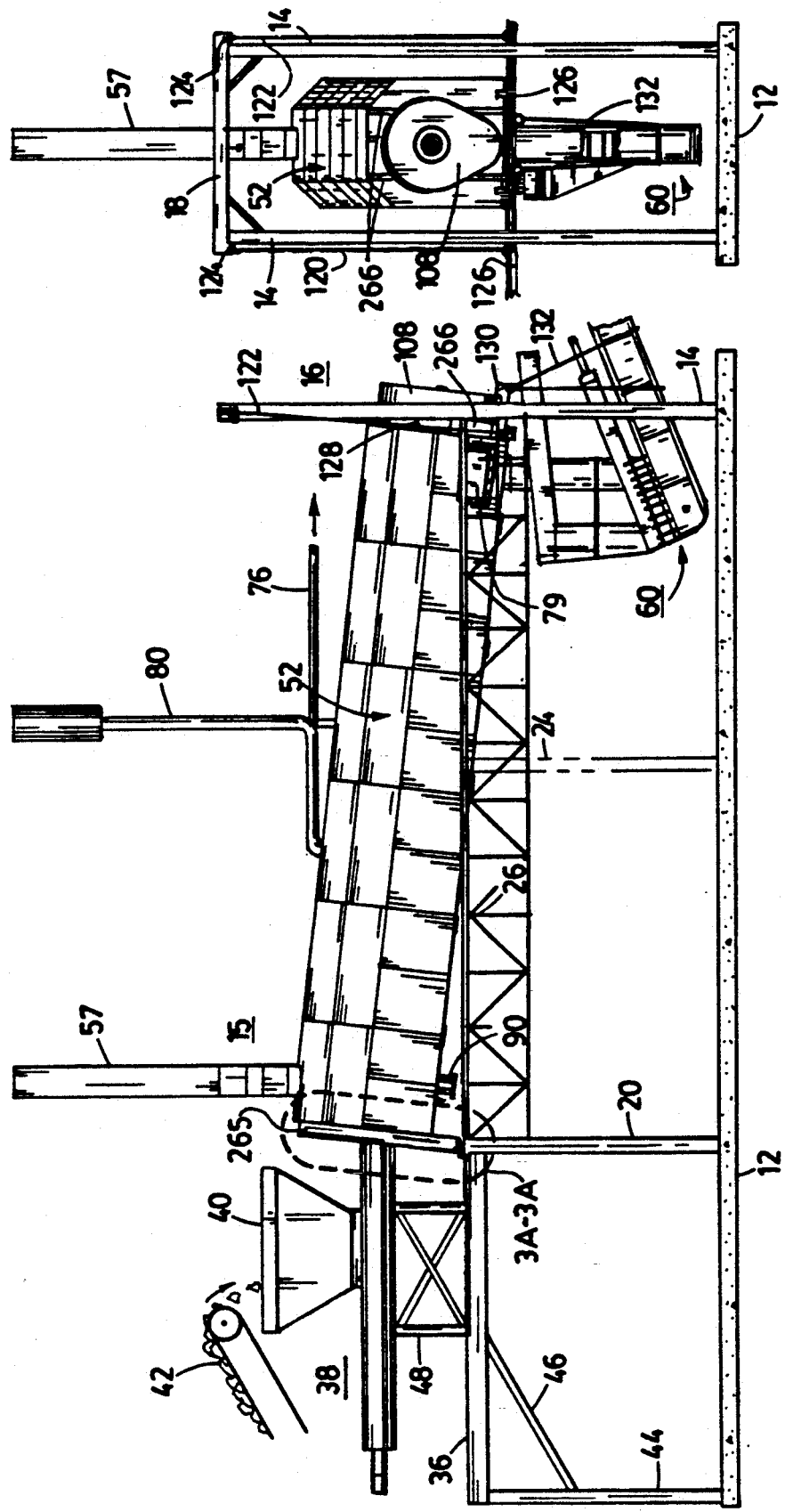

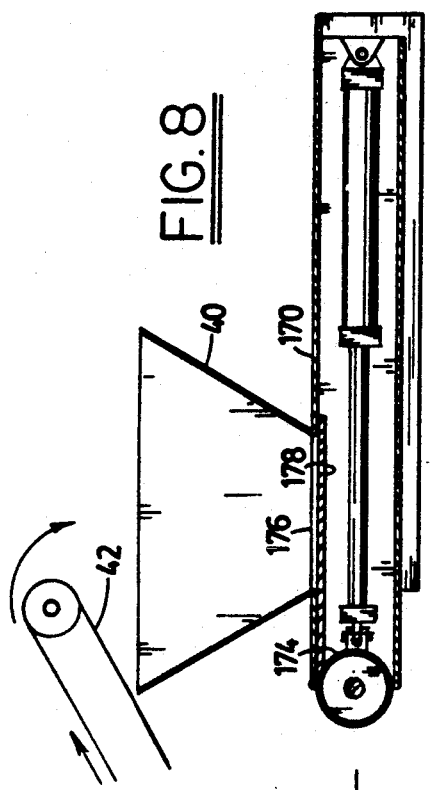
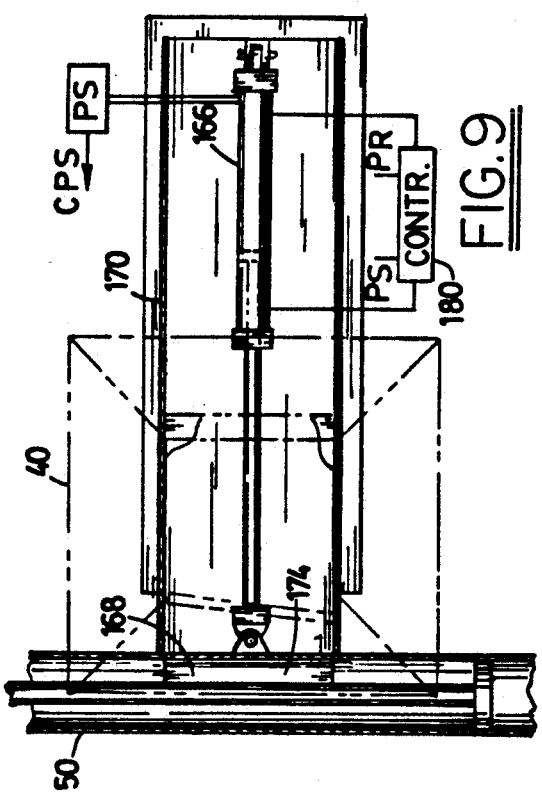
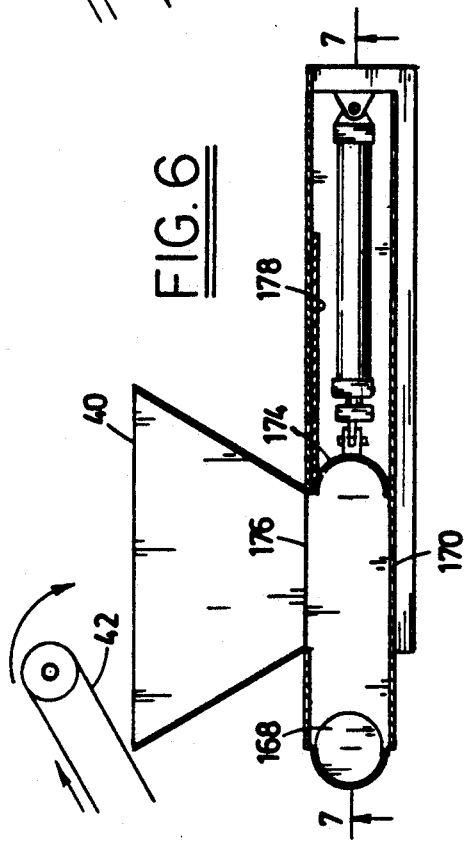
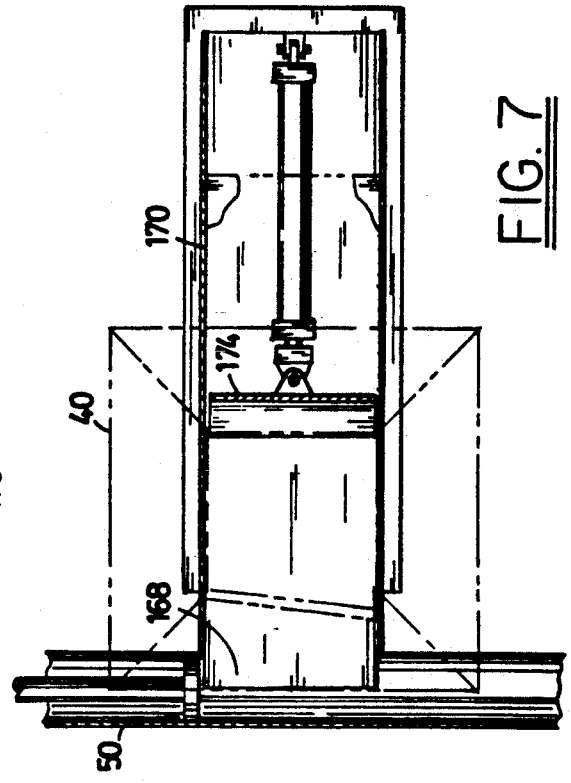

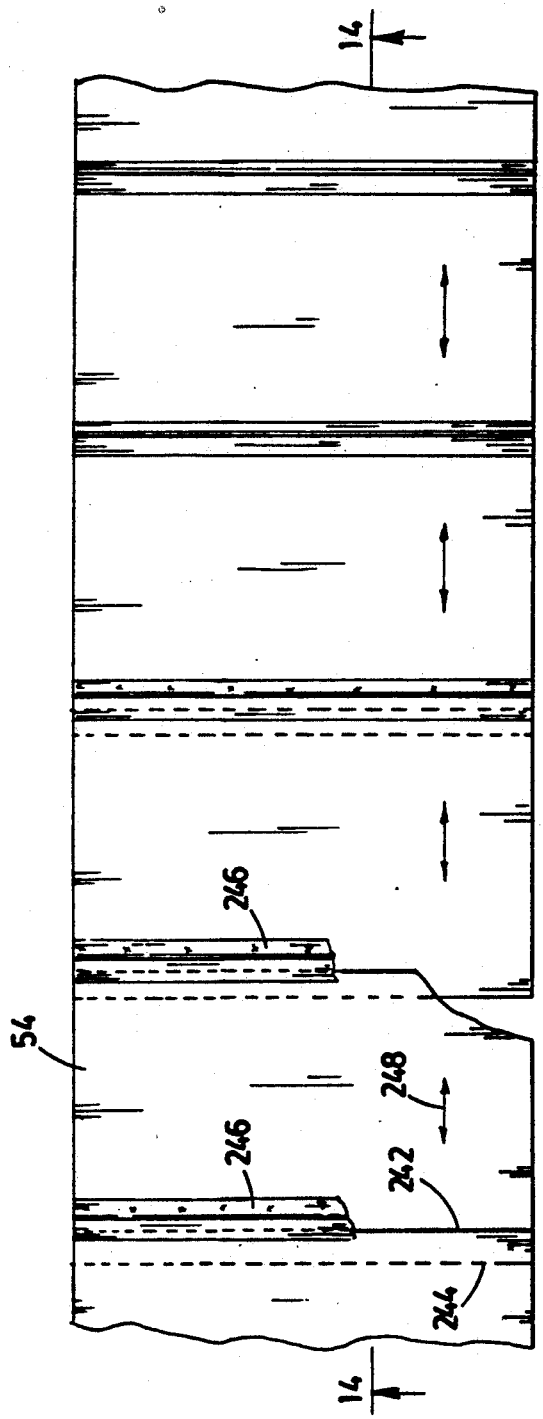
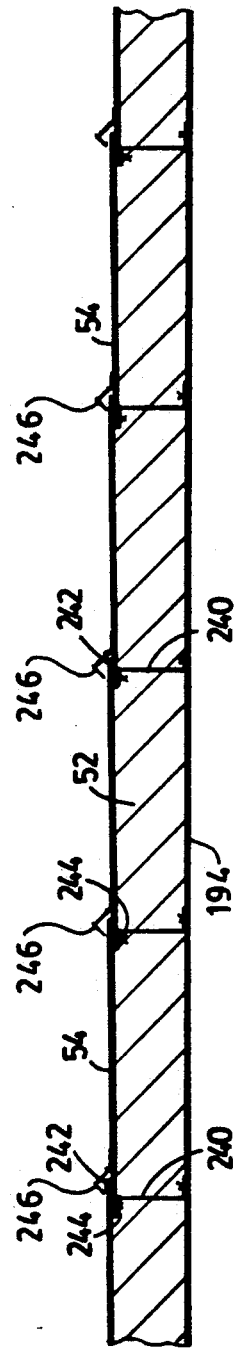

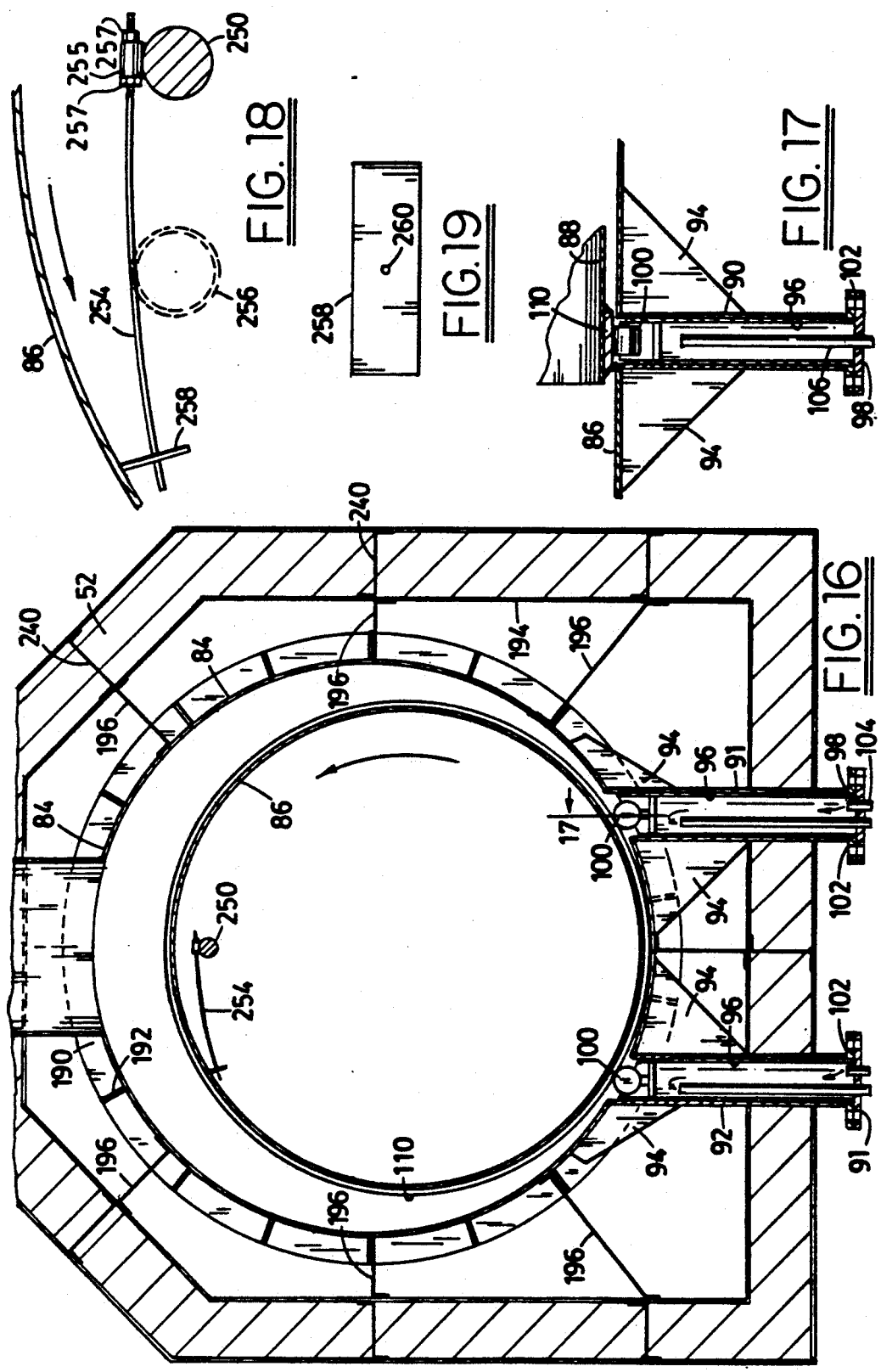

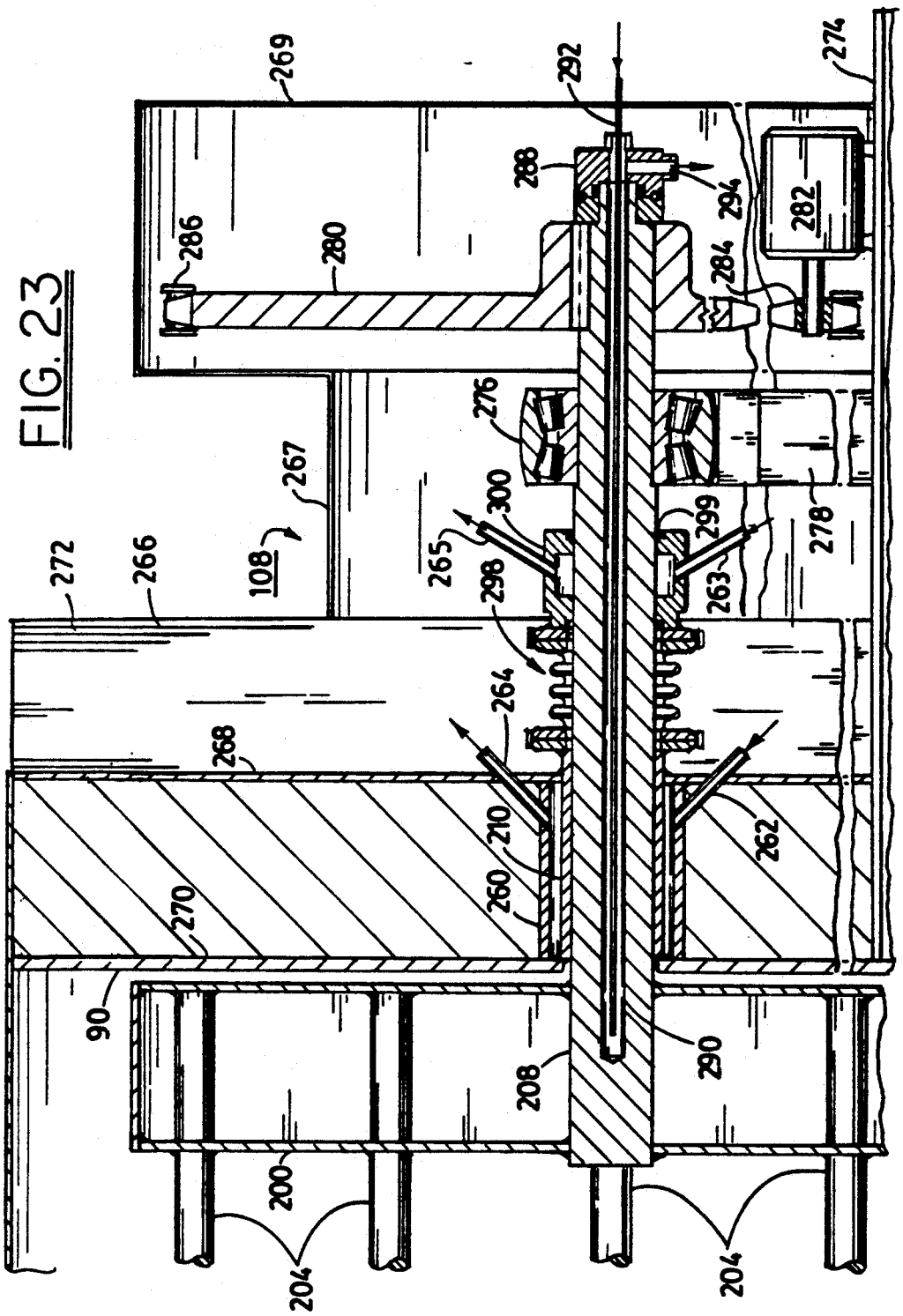

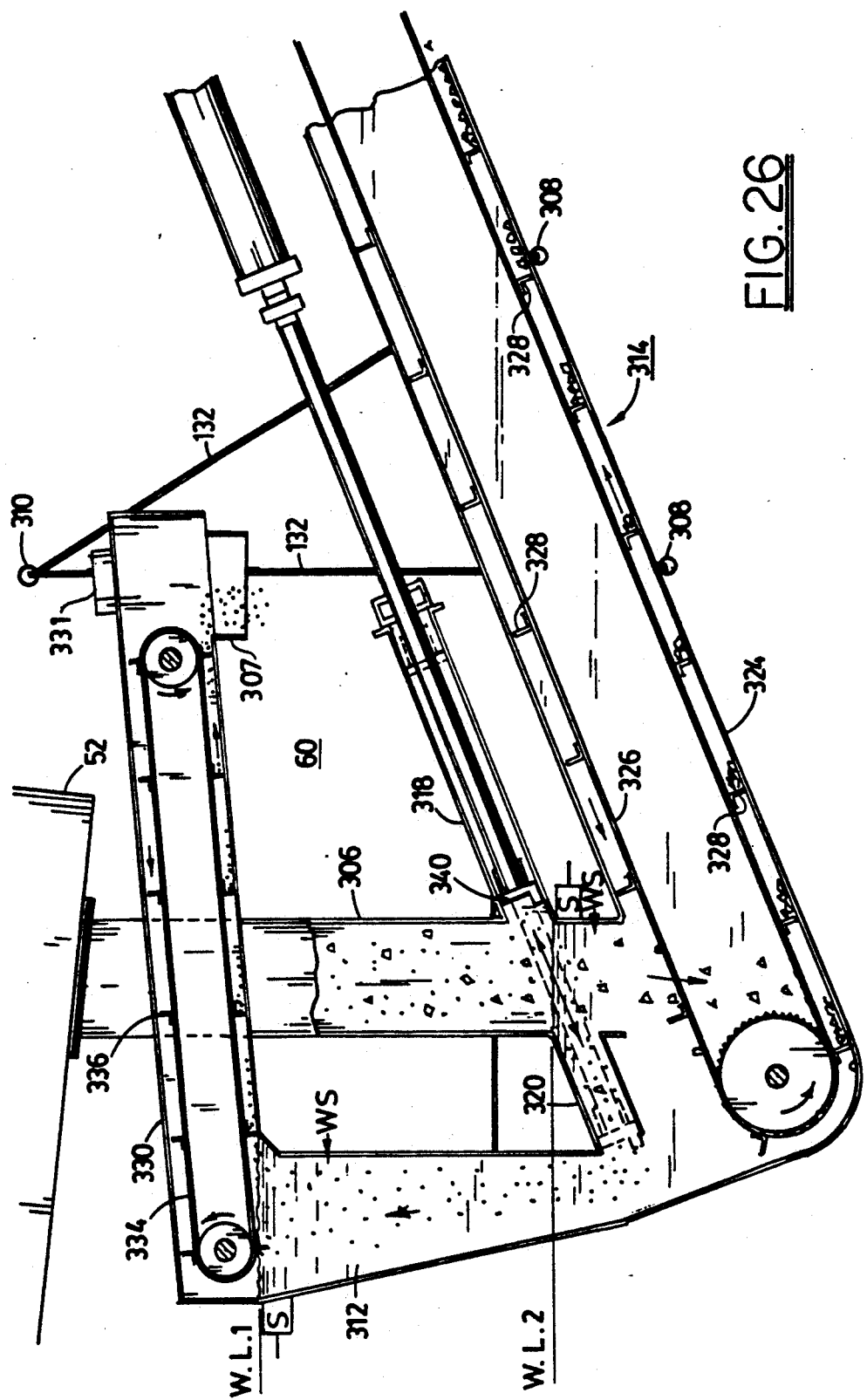

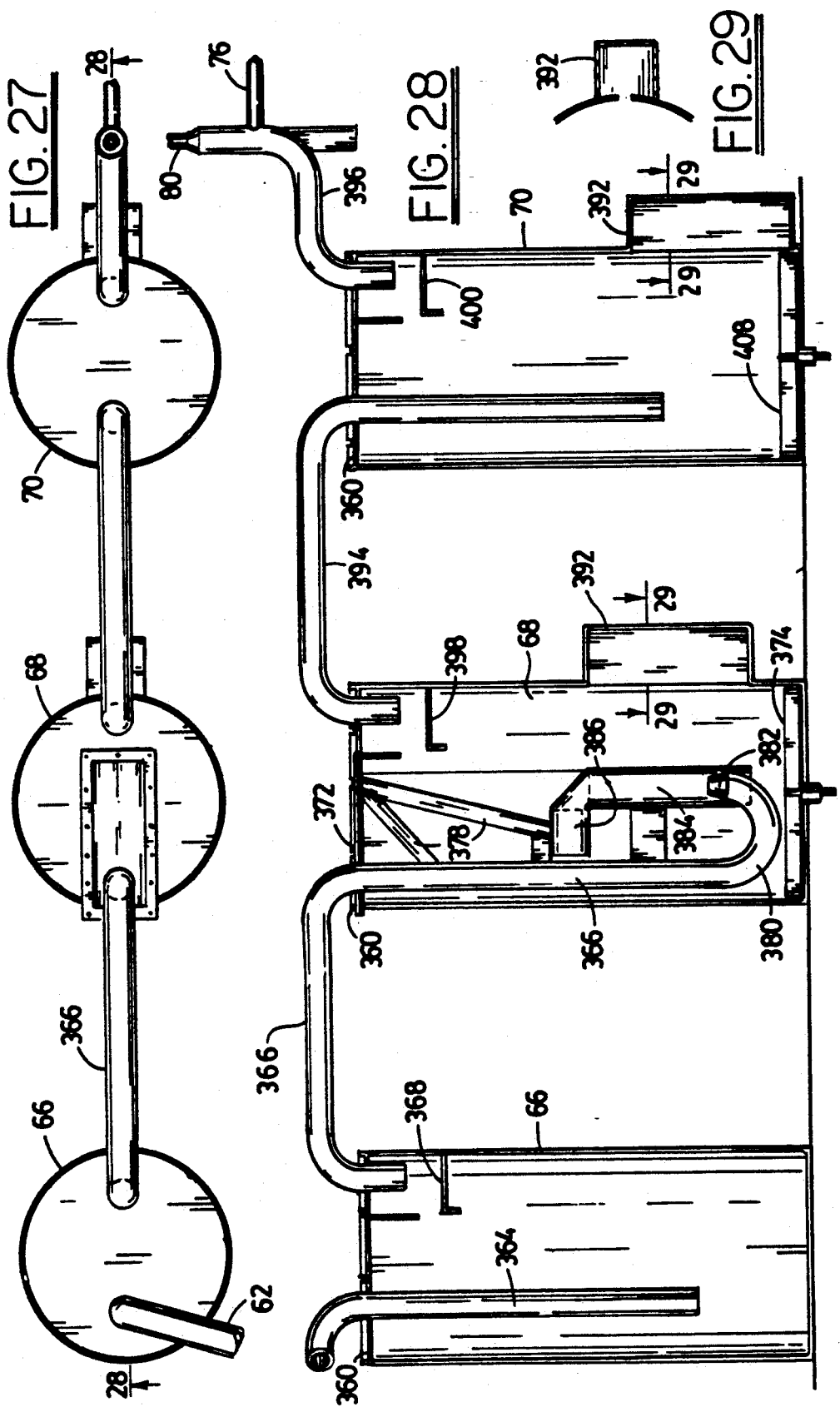

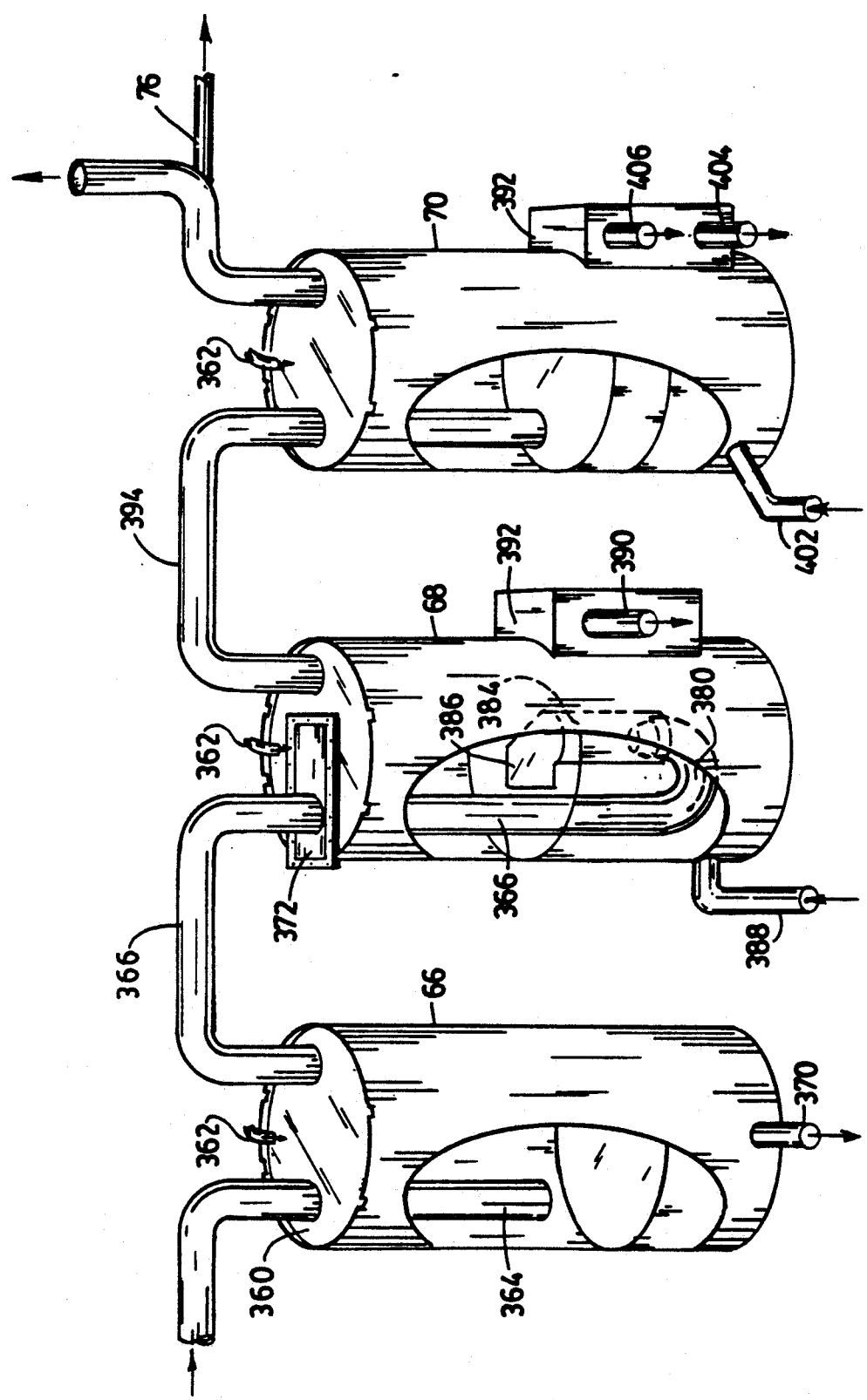

PYROLYTIC CONVERSION SYSTEM

DESCRIPTION

Field of the Invention and Related Invention

The present invention relates to pyrolysis conversion systems and particularly to improvements in pyrolytic converters having a rotating drum contained in an outer, stationary structural support and containment drum, which provides a substantially air tight region which is heated by radiation and convection and is disposed in an oven chamber defined by an insulated external shell, as described in U.S. patent application Ser. No. 494,256 filed Mar. 14, 1990 (now U.S. Pat. No. 5,082,534, issued Jan. 21, 1992) of which this application is a continuation in part This invention is especially suitable for use in the pyrolytic conversion of solid hydrocarbons into gases, liquid hydrocarbons, and char by the pyrolysis of various materials, such as tires and scrap resulting from the shredding of junked automobiles. The invention is also useful for pyrolyzing other wastes such as plastic materials, plastic containers and waste from fast food restaurants, garbage, sewage sludge, coal, oil shale, broken asphalt and the like which provides the feed stock for the converter of system. The above-referenced U.S. Patent shows and describes systems including a plurality of converters. This application describes a single converter which may be used as one of the stages of a plural stage converter.

BACKGROUND AND ASPECTS OF THE INVENTION

The pyrolytic conversion process requires high temperatures in the 1200° to 1800° F. range in the oven chamber. Then forces due to thermal expansion, as well as the thermal properties of materials, must be accommodated in order to achieve satisfactory operation in a commercial environment.

The products of pyrolyzation are gases and solids having various constituents which determine their volatility and density. The term "gas" as used herein includes non-condensible gases and also vapors (both oil and water vapors). These products are released at high temperature, which must be reduced in order to condense the gases into their liquid constituents and also to collect the solid products. Temperature differentials are required which must be accommodated to handle thermal expansion especially in the solids collection apparatus. It is also desirable to separate low density and high density solids, for example, char of low density from high density particles, such as fragments of metals and other materials which are not pyrolyzed.

The injection of the feed stock materials presents material handling problems, since it is desirable that the injection not introduce air into the converter (a dangerous condition). It is also desirable to provide convenient access to the internals of the converter for maintenance and repair and to assemble parts subject to wear so that their replacement is convenient.

Accordingly the present invention has the following aspects:

(a) allowance for heat expansion of the converter and also of the exterior casing of the converter, which is both practical and cost effective;

(b) assembling the converter and the apparatus, which handles the products discharged from the converter so that thermal expansion and contraction of the discharge handling apparatus is accommodated;

(c) separating and scrubbing the solids of low and high density, such as char resulting from the pyrolyzation of hydrocarbons and solids of material which has not been pyrolyzed, by selective floatation in liquid (water) which also reduces the temperature of these products;

(d) compacting materials to be pyrolyzed so that little or no preprocessing (comminuting) of these materials (feedstock) is needed and also so that when injected into the converter drum the feedstock materials maintain an air lock in an injector preventing the introduction of air which might give rise to dangerous operating conditions in the converter, and eliminating the need to use separately made bales or bags of such materials;

(e) condensing and scrubbing the gaseous products of pyrolyzation in a manner to separate hydrocarbon liquids, in accordance with their volatility, efficiently and without the need of expensive condensers and to prevent fouling of piping and duct work carrying these gaseous products;

(f) operating the converter with bearings and seals utilizing water for coolant and sealant purposes; and (g) arranging the components, parts and framework of the converter so as to enable the converter to be fabricated full scale, for example with the casing including the converter drum and support drum 30 to 40 feet in length and from 6 to 9 feet in diameter and in such a configuration to be operated at temperatures sufficient to pyrolyze feed stock materials, such as those mentioned above.

SUMMARY OF THE INVENTION

Briefly described, a pyrolytic converter embodying the invention utilizes a suspension, which is preferably provided by cables depending from a framework. The suspension provides a fulcrum at one end of the converter and a pivotal connection via the cables at the other end thereof which accommodates and allows for thermal expansion. Apparatus for handling the solid products of pyrolysis which are discharged from the converter are also suspended, preferably from the discharge end of the converter, by cables thereby allowing for thermal expansion. A burner and associated combustion chamber may also be suspended with the converter so as to accommodate the thermal expansion thereof. Separation of the higher and lower density products of pyrolysis relies on their relative buoyancy The discharge apparatus includes a discharge chute and an adjacent separating (floatation) chute and a discharge conveyor for solid residues, which contain water at different levels because of the above atmospheric pressure in the reactor which is communicated to the discharge chute. Across this water level and interconnecting the chutes is a channel through which a rake is reciprocated which drives the discharged Products under water and shifts the buoyant materials to the floatation chute where they float to the surface and can be skimmed off, as by a discharge skimming conveyor. Another conveyor removes the particles and objects which sink; moving them to a discharge position above water level.

The gaseous products are separated in a series of three tanks through which the gaseous products circulate and are condensed in inverse order of their volatility, in the first, second and third tanks. The second and third tanks have water circulated therein. In the second tank the water is converted, by steam and air pressure operated hydraulic means, into a spray for cooling and also scrubbing the gases as they pass through an inlet pipe into the tank.

The materials to be fed (feed stock) into the converter drum are compacted into cartridges in a section of an injection tube which receives the feed stock from a magazine having an opening in alignment with the lower end of a hopper. A gathering ram, with a cover which closes the opening, repeatedly moves reciprocally through the magazine, each time gathering additional materials and compacting the materials into a cartridge in the section of the injection tube. When the compacted density is sufficient, a cartridge formed in the section is advanced by a ram along the injection tube, in the direction of the introduction end of the converter drum. There the cartridge forms an air lock (with other cartridges). The injection tube and its associated compacting apparatus is moveable as a unit through a jacket into the and out of the converter drum. When moved away from the converter drum, an opening or man way is provided, which enables access to the converter drum for maintenance operations. In such operations, scraper plates which are loosely mounted on spring arms may be replaced by moving the spring arms away from the outer periphery of the converter drum to provide sufficient clearance for the plates to be removed and replaced.

BRIEF DESCRIPTION OF THE DRAWINGS

The invention will be more fully appreciated from a reading of the following detailed description of a presently preferred embodiment thereof in connection with the accompanying drawings wherein:

FIG. 3 is an enlarged right side elevation of the converter system shown in FIGS. 1 and 2;

FIG. 4 is a rear elevation of the converter system;

FIG. 6 is a sectional view of the feed stock material cartridge forming apparatus taken along the line 6—6 in FIG. 5;

FIG. 7 is a sectional plan view taking generally along the line 7—7 in FIG. 6;

FIG. 8 is a view similar to FIG. 6 with the gathering ram at the end of its travel towards the left;

FIG. 9 is a view similar to FIG. 7 with the gathering ram in the position shown in FIG. 8 and with the injection ram advanced towards the converter drum;

FIG. 13 is a view of the outer casing of the converter showing the overlapping or shingled relationship of the panels of the casing's outer shell and their stiffening roof strips;

FIG. 14 is a fragmentary sectional view taken alone the line 14—14 in FIG. 13;

FIG. 16 is a fragmentary sectional view taken along the line 16—16 in FIG. 15;

FIG. 17 is a sectional view of one of the stanchions and roller journals, which view is taken along the line 17—17 in FIG. 16;

FIG. 18 is an enlarged end view along a plane perpendicular to the axis of rotation of the converter drum showing the scraper mechanism;

FIG. 19 is a front view of a scraper plate;

FIG. 23 is an enlarged fragmentary view showing the journal and drive system at the rear or discharge end of the converter;

FIG. 26 is an enlarged sectional view illustrating the internals of the collection and discharge apparatus shown in FIGS. 24 and 25;

FIG. 27 is a top view of the product gas scrubbing and condensing apparatus;

FIG. 28 is a sectional view taken along the line 28—28 in FIG. 27;

FIG. 29 is a fragmentary sectional view taken along either of the lines 29—29 in FIG. 28; and FIG. 30 is a perspective view illustrating the product gas condensing and scrubbing apparatus.

DETAILED DESCRIPTION

Figure 1:
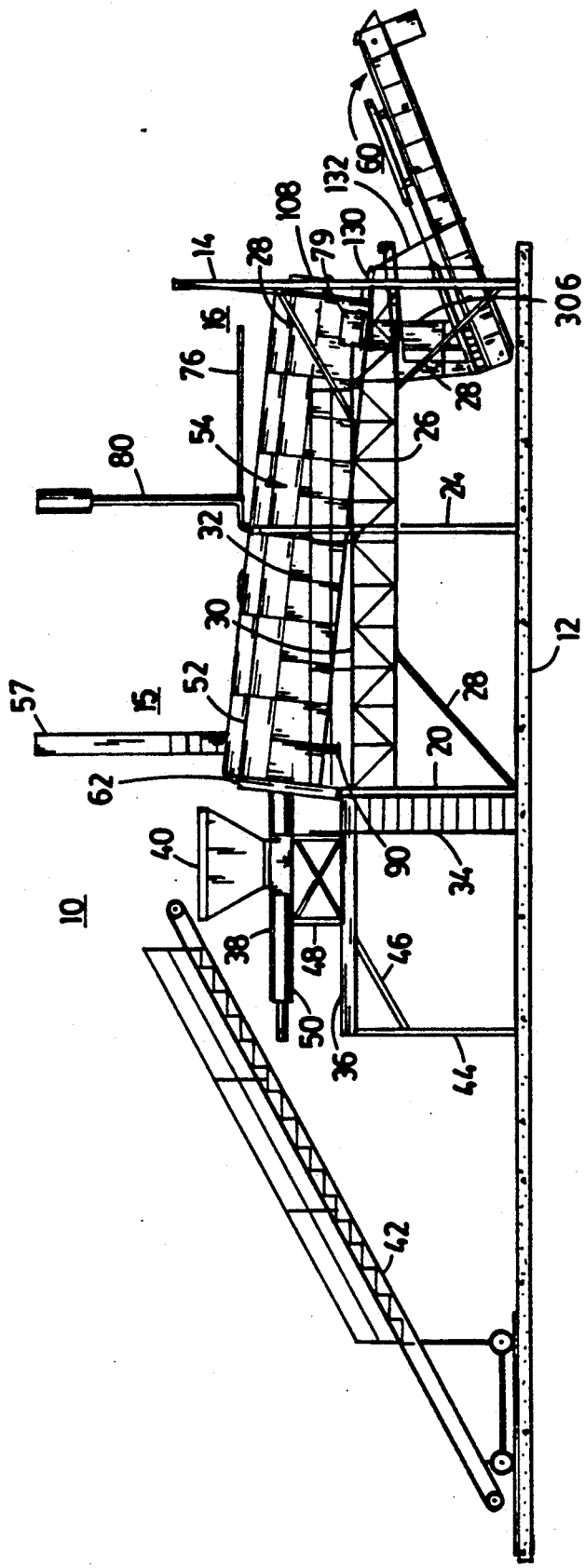
FIG. 1 is a right side elevation of a pyrolytic conversion system embodying the invention.
Figure 2:
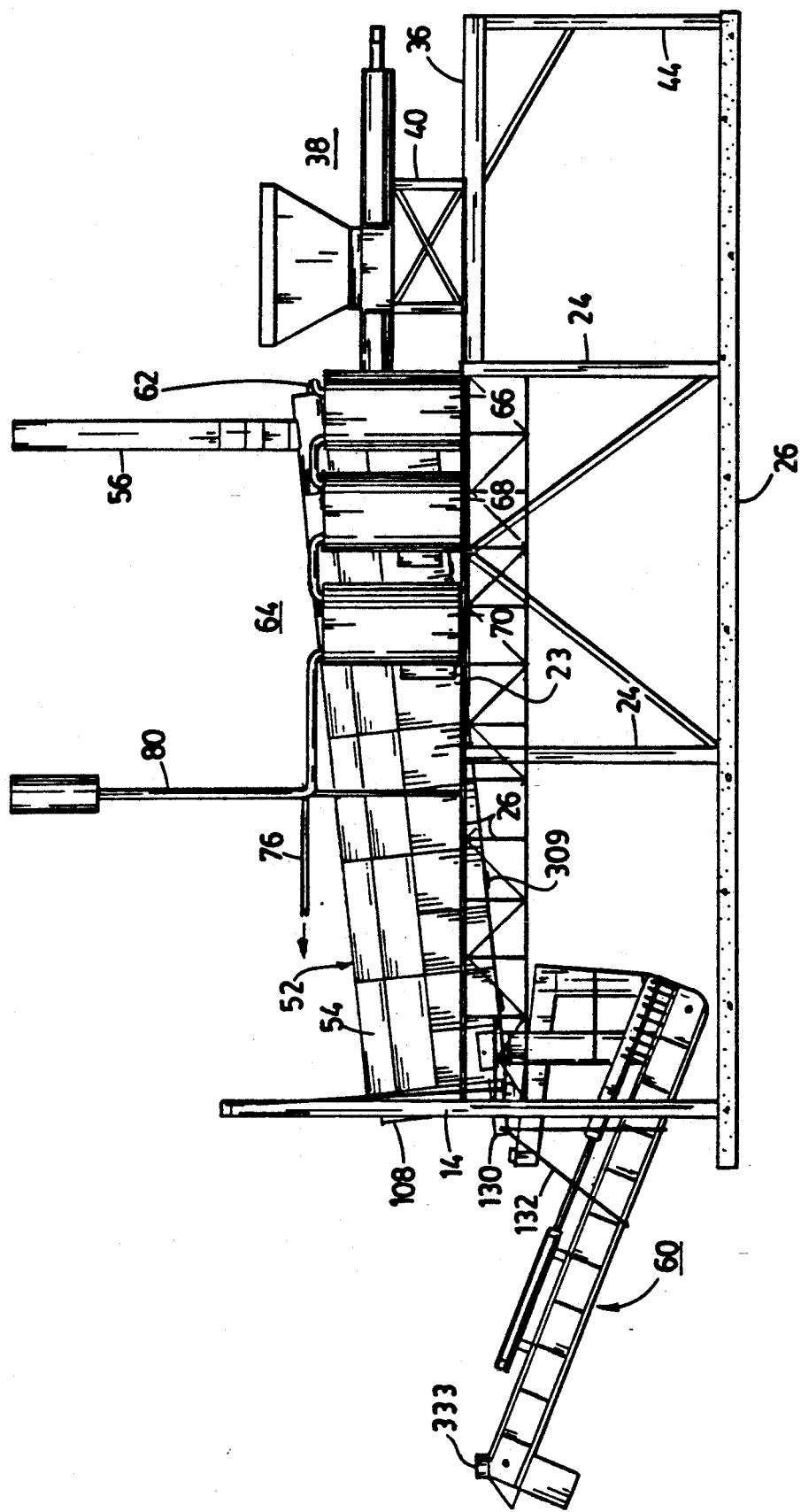
FIG. 2 is a left side elevation of the apparatus (except for the feed stock lift conveyer) which is shown in FIG. 1.
Figure 3A:
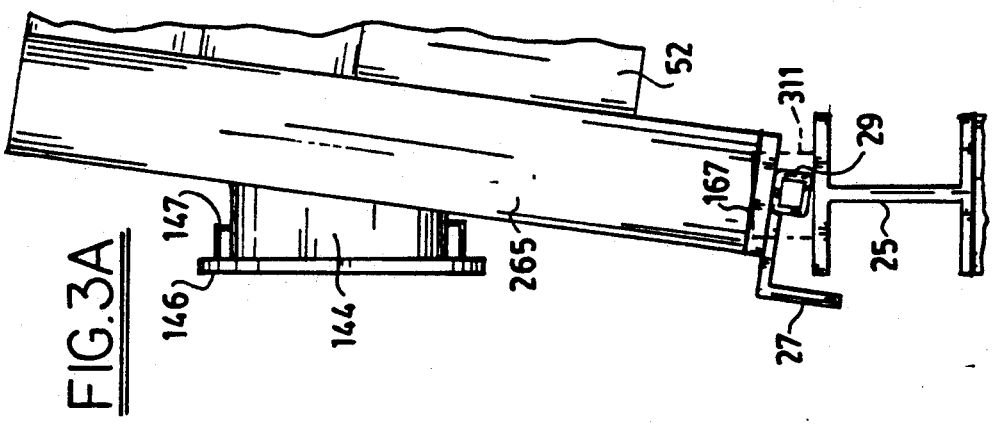
FIG. 3A is an enlarged view of the region 3A—3A shown in FIG. 3.
Figure 3B:
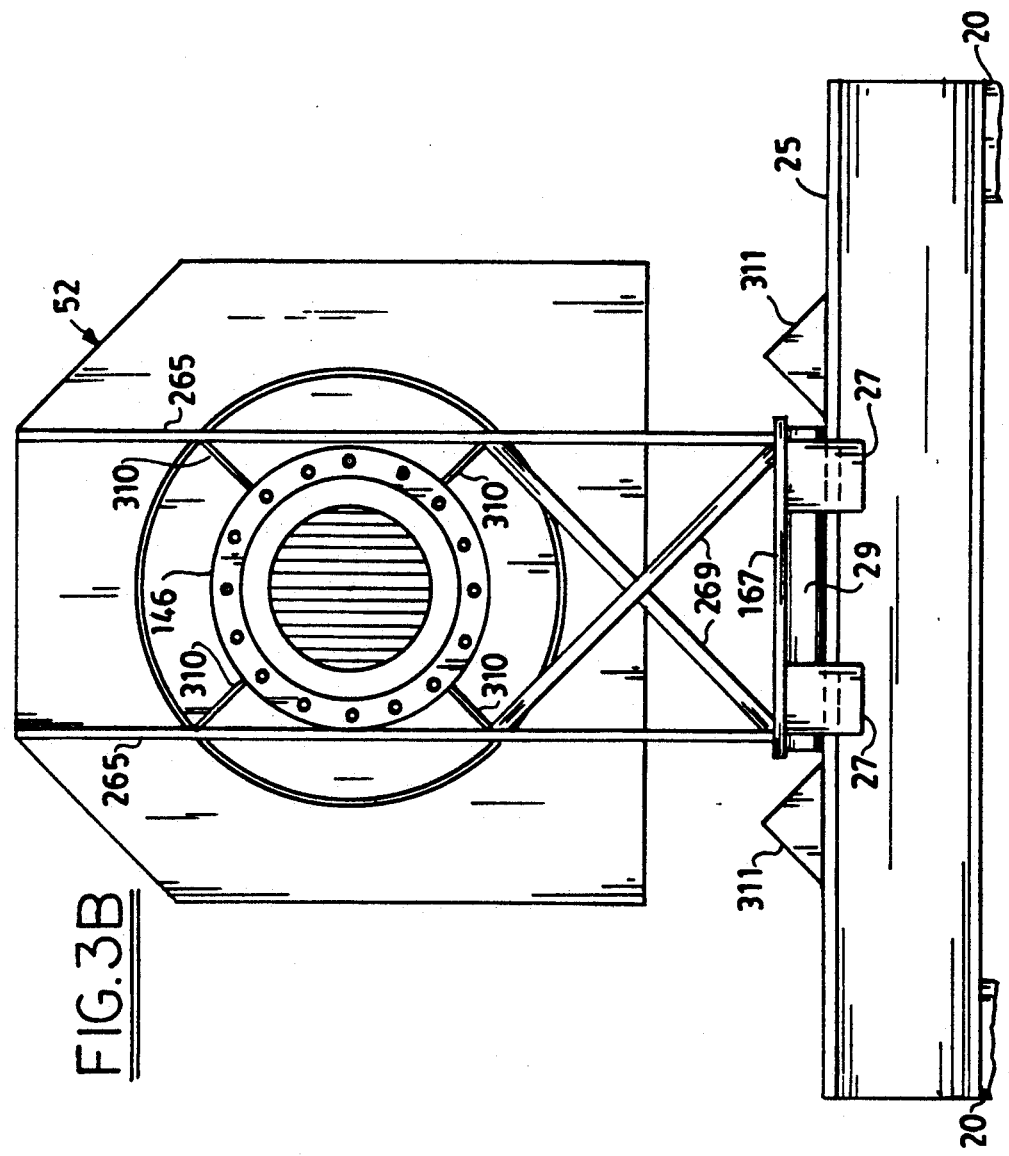
FIG. 3B is an enlarged end view of the region shown in FIG. 3A.
Figure 5:
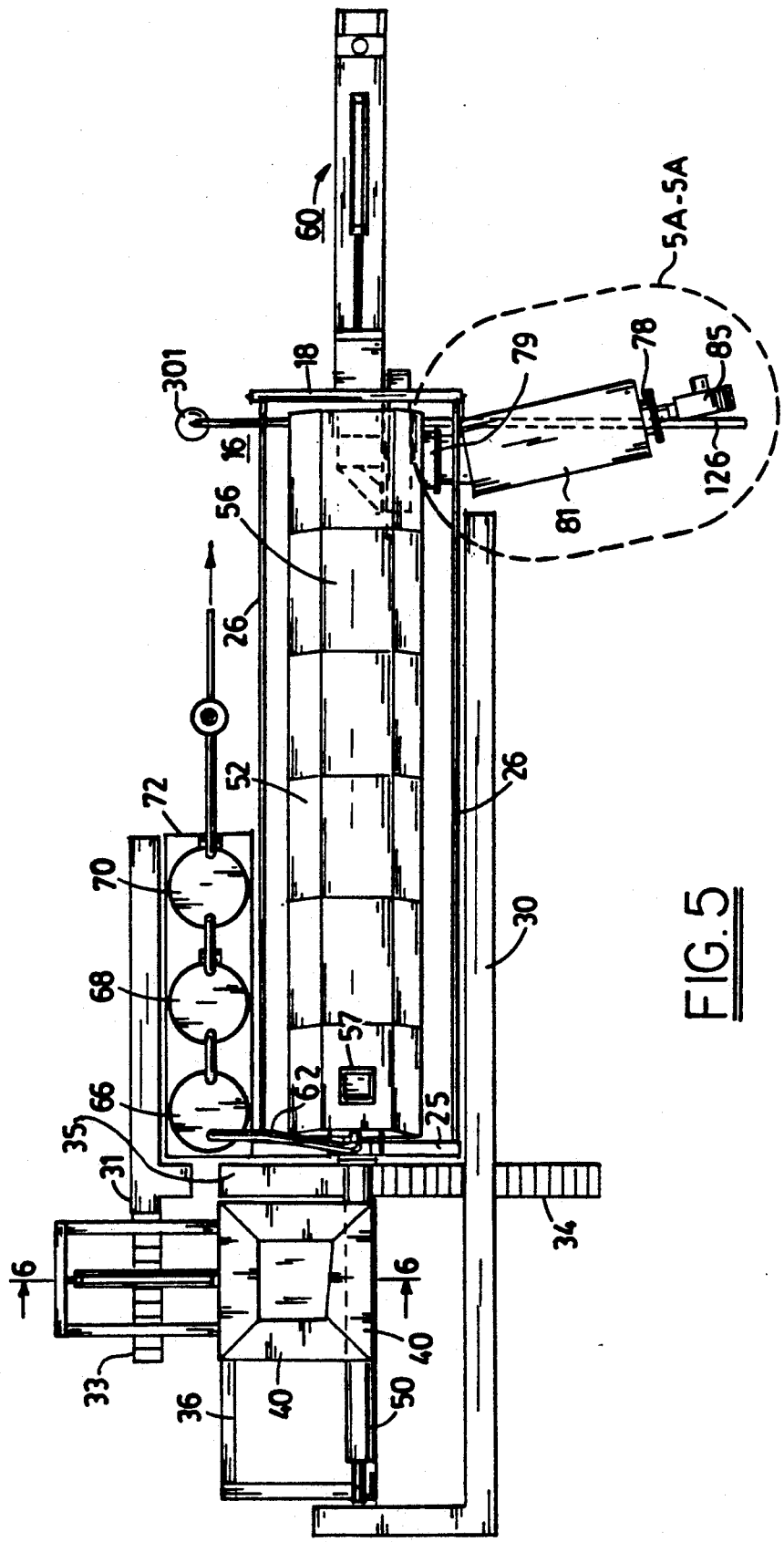
FIG. 5 is a top view of the converter system.
Figure 5A:
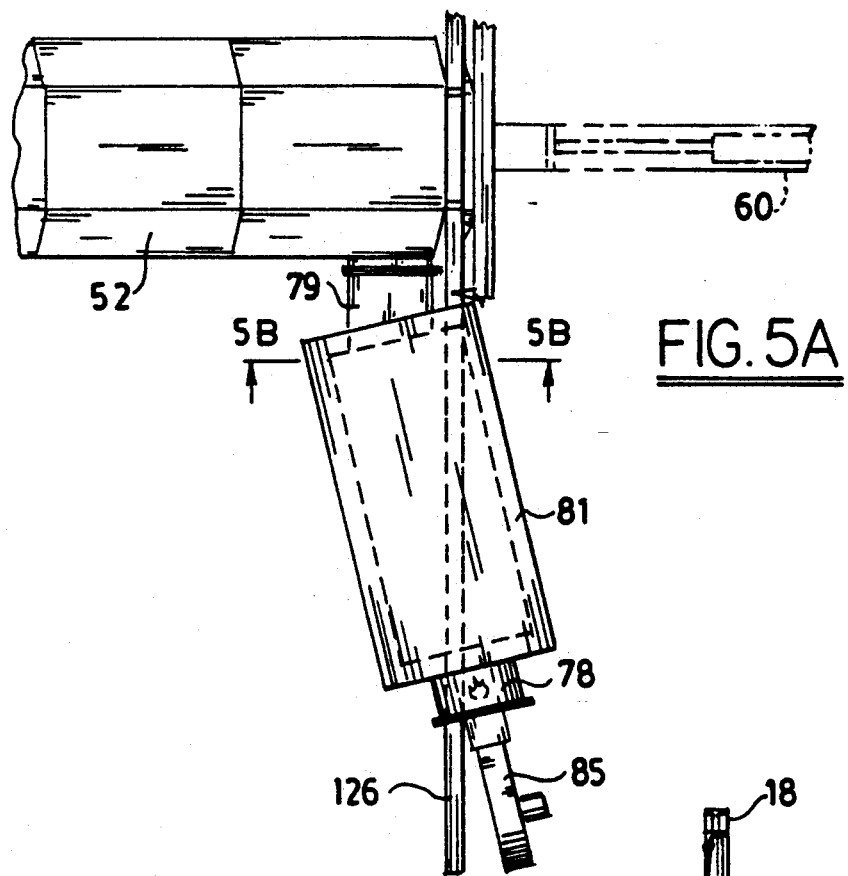
FIGS. 5A, B & C are respectively fragmentary plan, left side and rear elevational views of the converter system of the region 5A—5A shown in FIG. 5, showing the combustion unit in greater detail.
Figure 5B:
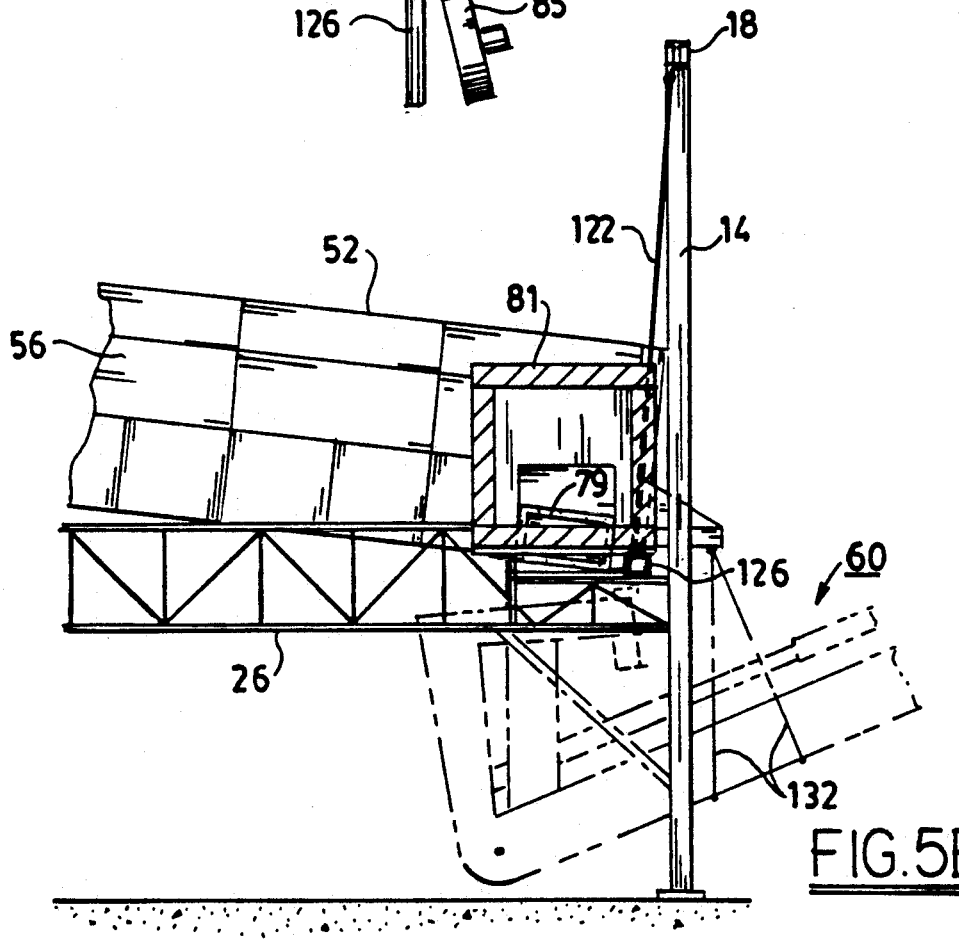
Figure 5C:
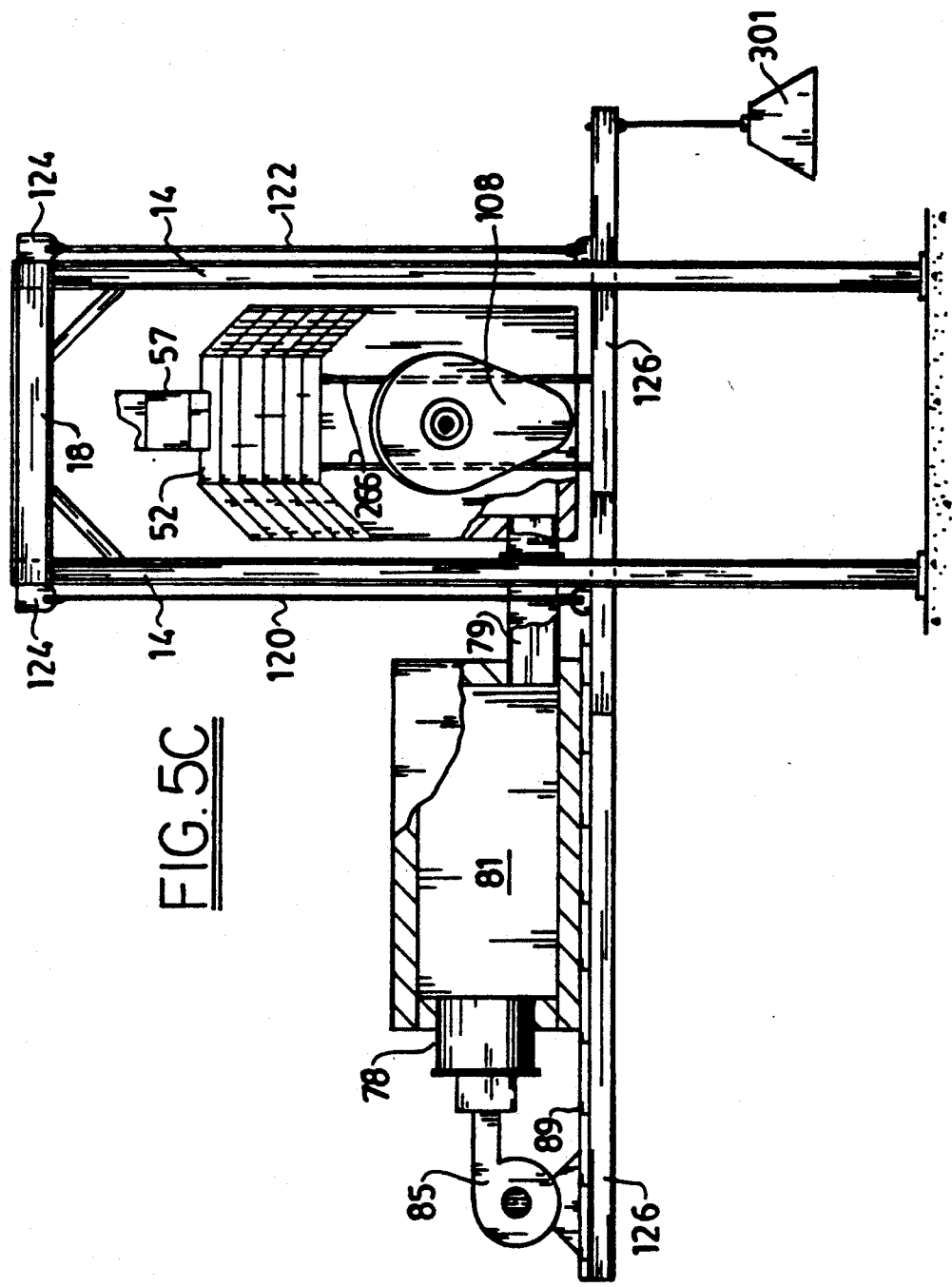

Referring to FIGS. 1 and 2, there is shown a pyrolytic converter 10 which is supported on the ground, preferably on a reinforced concrete base 12. The apparatus has a frame work or super-structure made up of a rear pair 14 of column girders at the discharge end region 16. These girders are bridged by a beam member 18 (see FIG. 4). There is a front pair of column girders 20 at the introduction end 15 where material to be pyrolyzed is introduced into the converter 10. These front column girders 20 are bridged by another beam member 25 (see FIG. 5) which provides a base for a fulcrum at which the converter is supported at its front end. A truss structure 26 is connected to the column girders 14 & 20 on each side thereof, and together with slant struts 28, rigidify the super-structure.

Figure 12:
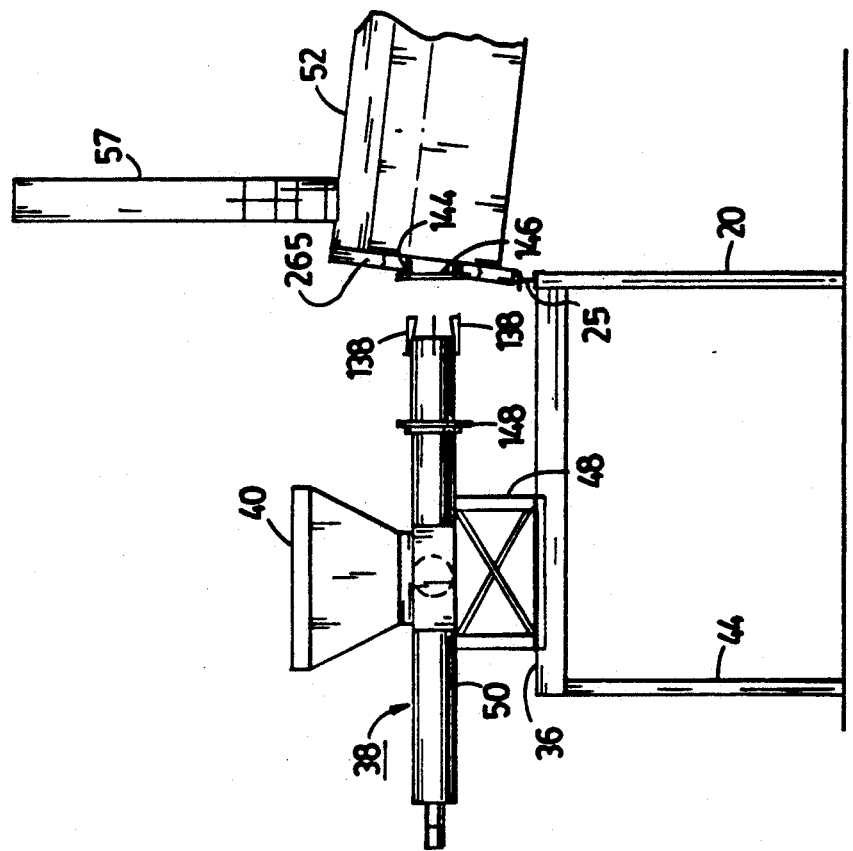
FIG. 12 is a view similar to FIG. 11 showing the apparatus shown in FIG. 10 removed from the converter.

A walkway 30 guarded by railings 32 extends alongside the converter. See also FIG. 5. Access to the walkway is by way of stairs 34. The stairs also extend to a walkway 35 adjacent a platform 36 made up of a frame made up of the cross beam 25 and side and end beams 36 which supports a gathering and injection mechanism 38 for the feed stock to the converter, which is delivered to a hopper 40 by a portable lift conveyer 42, so that the hopper can be loaded from the front or from the sides of the converter 10. The beams 36 are supported on legs 44 and rigidified by cross struts 46. The injection mechanism (see also FIG. 10) including the hopper 40 is supported on a moveable cradle 48 which enables the injection tube 50 of the mechanism 38, as well as the entire mechanism, to be shifted between the positions shown in FIGS. 11 and 12, where the injection tube is inserted into and removed from the converter, respectively. The stairs 34 may continue up to another walkway 35 near the top of the hopper 40 so as to provide operator access thereto.

The converter 10 has a casing 52 with an outer shell made up of rows of panels 54 which are disposed in overlapping or shingled relationship. Bent panels 56 form the roof of the converter casing. These panels 56 are bent so as to be trapezoidal in shape in cross section. The overlapping or shingled edges of the panels 54 are as shown in FIGS. 13 and 14. These edges run transverse to the axis of the converter. The bent panels 56 are also shingled along their transverse edges.

A chimney 57 for flue gases extends from the converter near the end region 15 thereof where the materials to be pyrolyzed are introduced. The solid products of pyrolyzation leave the converter through a discharge chute 306 of a collection and separating apparatus 60. The gaseous products of pyrolyzation pass via an outlet pipe 62 (see also FIG. 5) to a condenser system 64 having three tanks 66, 68 and 70, through which the gases successively pass and are condensed. The tanks rest on a platform 72 on the side of the converter opposite from the stairway 34. A separate walkway 31 with a set of stairs 33 at one end thereof provides access to condenser system 64. The platform 72 is supported on columns 24 connected by cross beams extending between the columns 24 along the length and width of the platform. The tanks are connected by pipes. Uncondensed gas is taken off by a outlet pipe 76 which may be connected to a storage tank. The collected gas may be used to fire a combustion unit 78 which heats the converter to pyrolyzing temperatures. The noncondensible product gases are methane, propane, etc. and they or natural gas or propane may be used to fire the unit 78. The unit is desirably a forced air or duct burner of the type which is commercially available. Only the inlet ducting 79 from the combustion unit to the converter is shown in FIGS. 1–4. Excess gas may be flared at the end of a flare pipe 80 or piped into the combustion chamber of the combustion unit.

The converter has, within the casing 52, an inner support drum 84 (see FIG. 15) which is closed by end bulkheads 88 and 90 at the introduction and discharge regions 15 and 16 of the converter, respectively providing with associated seals, an air tight chamber in which the converter drum is disposed. The converter is structurally integrated by its inner support drum structure. This integrated support structure rests on the cross beam 25 of the framework at the front end thereof. The rear end is suspended at its rear end from the cross beam 18 by a pivotal suspension system using cables 120 and 122 best shown in FIGS. 3, 4 and 25, and described more fully below. The suspension system uses a pair of vertical riser plates 265 attached to the front end bulkhead 88. Another pair of vertical riser plates 266 are connected to the rear end bulkhead 90. The suspension system allows for thermal expansion of the converter assembly.

Figure 15:
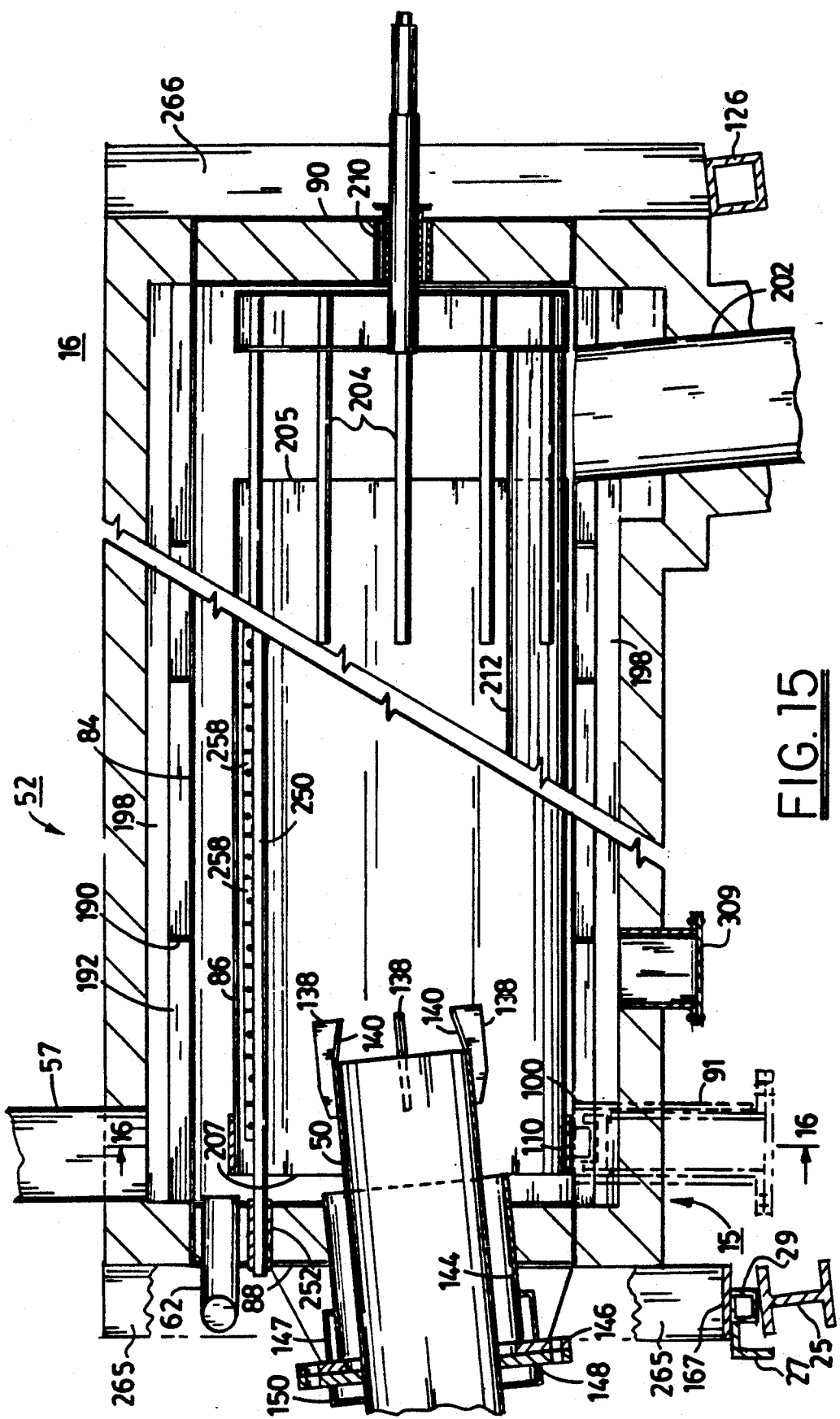
FIG. 15 is an enlarged sectional view in elevation along a vertical plane through the converter apparatus and showing the converter drum, the outer structural support drum and the casing and also showing the inner end of the injection tube and the jacket, seal assembly thereof, the stanchions for journaling the rotary converter drum at the injection end thereof, the fulcrum supporting the converter and also showing the product gas outlet and the discharge chute where they enter the converter.

The front end of the converter rests on the beam 25 in a manner to define a fulcrum which enables the converter to be tilted at a small acute angle downwardly from its front end 15 to its rear end 16. This angle may be about 6°. FIG. 15 shows the converter drum axis horizontal and the injection tube axis tilted upwardly. It will be appreciated (see FIGS. 1 and 3) that the converter axis (the axis of the drums 84 and 86) is tilted downwardly and the injection tube axis is horizontal.

The suspension system provides a fulcrum at the upper face of the cross beam 25 which is horizontal. See FIG. 3A & B. A cross beam 29 is attached as by welding to a plate 167 extending between and welded to the lower edges of the front end vertical risers 265. Cross struts 269 between these risers rigidify the assembly. The cross beam 29 is preferably a small (e.g. $3'' \times 3'' \times \frac{1}{2}''$) square structural steel tube and has slightly rounded edges, thus providing the fulcrum on the cross beam's upper surface. Angles 27 may be connected to the plate 167 and act as stops in the remote event that the converter moves off the beam 25, as in assembly of the system 10. Stops 311 on the cross beam prevent lateral shifting of the converter assembly at its front end 15.

The front or introduction region 15 of the inner drum support structure has, as best shown in FIGS. 15 and 16, use a pair of laterally spaced stanchions 91 and 92 connected by way of gussets to the inner support drum 84 and also connected thereto by welding. The stanchions are tubular and support, on interior sleeves 96 (see also FIG. 17), which extend upwardly from flanges 98, roller bearing assemblies 100. The inner converter drum 86 is journaled and rotates on the rollers of the roller assemblies. The outer tube of the stanchions extends to a lower flange 102 which may be bolted to the flange 98 in assembling the stanchions 91 and 92. The interior of the stanchions define chambers in which reservoirs of cooling water are circulated by inlet and outlet pipes 104 and 106. Thus, as the converter drum is rotated by a drive mechanism 108 at the rear or discharge end region 16 of the converter, the converter drum rotates on the rollers. A bearing ring 110 is provided upon which the rollers bear. This ring 110 also stiffens the converter drum.

The remainder of the support for the converter (the casing and the inner and outer drums and their associated bulkheads and drive mechanisms), and also for the combustion unit, and separating and collection apparatus 60, is provided by a pivotal suspension of the converter in the discharge region 16 thereof. Optionally, the combustion unit may be mounted off the converter and connected by a flexible duct (bellows) to the inlet ducting 79. The suspension and the fulcrum provided by the beams 25 and 29 provide a pivotal support for the converter. Cables of steel wire 120 and 122, provide the main suspension. These wires are connected to the beam member 18 by means of ears 124 welded to ends of the beam member 18, which is disposed above the discharge end of the converter. See also FIG. 4, 20 and 25. The cables extend to a cross beam 126 which is attached to the rear vertical risers 266 and thereby, via the bulkhead 90, to the inner support drum 84 of the converter (see FIGS. 3 and 4). Gussets 271 (see FIG. 25) further strengthen the connection of the risers 266 to the bulkhead 90. A pair of arm members 130 are welded to the rear riser 266 and project rearwardly and provide support for a cable arrangement 132 which cradles the separation and collection apparatus 60. Accordingly, the entire converter 10, including its collection and separation apparatus 60, all of which operate at high temperature and are subject to thermal expansion, are suspended by the pivotal support suspension of the cables 120, 122 and 132 to allow for thermal expansion. As the converter expands, the cables pivot or swing and the converter rocks or tilts slightly on the fulcrum provided by the beams 25 and 29. For a thirty-two foot long converter and an average expansion of about 6 inches, the variation in inclination of the axis of the converter is not significant to the pyrolytic conversion process.

As shown in FIGS. 5 and 5A to 5C, the combustion unit 78 is made up of a combustion chamber 81 and a burner 83. The burner is a conventional forced air burner of the type which is commercially available and has a blower 85. The duct work 79 and the burner 83 are connected to opposite ends of the rectangular combustion chamber. The combustion chamber 81 mounted on a platform 89 rests on the beam 126. It is counterweighted at the opposite end of the beam by a weight shown schematically at 301. The combustion chamber provides a residence time for hot combustible gases including any gases which may be vented to the combustion chamber instead of to the flare 80. If vents are used for pressure relief in gas and oil holding or storage tanks, the vented gases can be returned to the combustion chamber and burned therein. Thus, the combustion chamber is used to prevent environmentally damaging emissions from the system 10.

Referring again to FIG. 15, the injection tube 50 is shown having four blades 138, 90° apart, with their cutting edges 140 extending inwardly so as to cut and sever cartridges of the material feedstock which is injected through the tube 50 by the injection mechanism 38. The injection tube 50, as well as the entire mechanism is removable from the converter as explained above in connection with FIGS. 11 and 12. To facilitate this removal, there is provided a tube 144, which is welded to the introduction end bulkhead 88 on both of its side plates 88a and 88b and terminates at a flange 146 (see also FIGS. 11 and 12). A water jacket 147 is disposed outside of the bulkhead 88 and extends to the flange 146. Another water jacket 150 is disposed around the injection tube 50 and terminates at its flange 148. Water is circulated through these water jackets 147 and 150 to keep the flange and seals therebetween cool.

Referring to FIGS. 6-10, there is shown the injection mechanism 38. The injection tube 50 contains a ram 160 which is driven by an actuator which may be a hydraulic cylinder. The actuator 162 has hydraulic lines connected to a controller 164. It switches pressure from supply $P_S$ (pump pressure) to return $P_R$ (reservoir pressure) in response to a control signal CPS. CPS originates in the cartridge forming mechanism in response to pressure developed in its actuator 166, which may also be a hydraulic cylinder. The pressure switch responds to the back pressure on the actuator which is a function of the compression of the feed stock material in a section 168 of the injection tube. This section is defined by a magazine 170 which is connected to the platform 48 (see, FIGS. 11 and 12) via a frame of eye beams 172 and extends beyond the platform. The actuator 166 is anchored in the rear eye beam 172 and is connected to a gathering ram or shovel 174, of hemi-cylindrical shape. The shovel is reciprocated by the actuator repeatedly between the position shown in FIGS. 6 and 7 and the position shown in FIGS. 8 and 9. The closed position is shown in FIGS. 8 and 9. There the shovel closes the section 168. A cover 178 moveable with the shovel seals the opening 176. Each timethe shovel 174 reciprocates, it picks up more material and further compresses the material into a cartridge in the section 168. A controller 180 provides for continuous reciprocation by alternating the pressure between $P_S$ and $P_R$ on opposite sides of the cylinder of the actuator 166. The operation of the actuator and of the gathering ram may be stopped by moving the controller to an off position.

Figure 10:
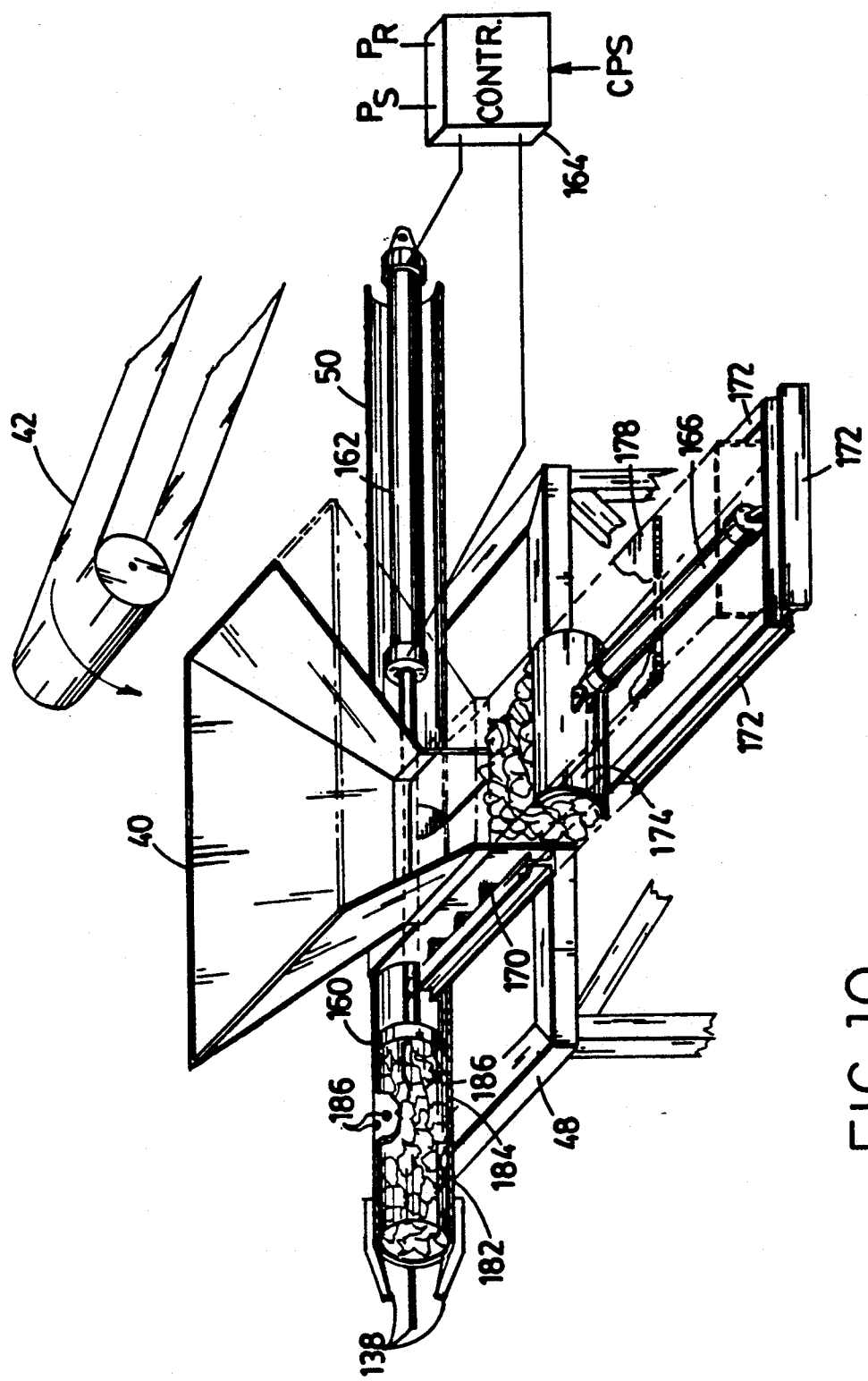
FIG. 10 is a diagrammatic perspective view of the apparatus shown in FIGS. 6 through 9.
Figure 11:
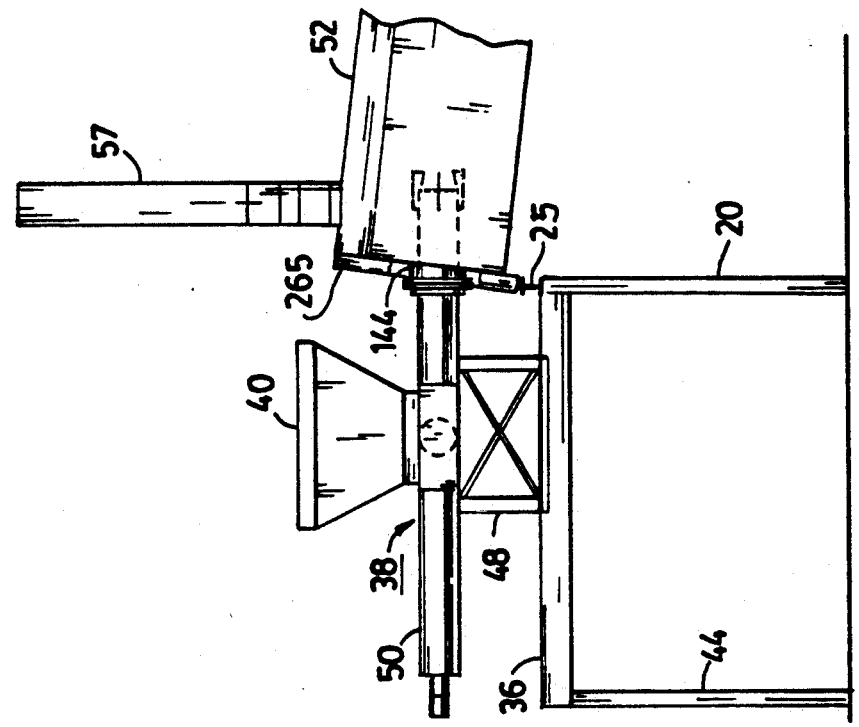
FIG. 11 is a fragmentary right side elevation showing the location of the apparatus shown in FIG. 10 and injection tube in operating position in the converter.

A compact cartridge is indicated by an electric or fluid pressure output signal CPS from a pressure switch PS. In other words, when the back pressure on the shovel exceeds a predetermined pressure, the pressure switch PS outputs CPS to the controller 164 of the actuator 162. Then, the actuator 162 is actuated and advances the cartridge by a distance equal or somewhat greater than the axial length of a cartridge, two of which 182 and 184 are shown in FIG. 10. The leading cartridge is forced into the converter drum. While being forced into the drum, it is severed and comminuted by the blades 138. The compact cartridges form an air lock or seal in the injection tube 50. Any air is exhausted through bleed holes 186. Also, any excess moisture (liquid) flows out through these holes, thereby providing an air tight seal against the admission of air into the converter drum which might cause a dangerous condition. A high temperature seal material between the flanges 146 and 148 is used to seal the injection end of the converter at the flanges 146 and 148. The water jackets 147 and 150 cool the flanges and their seals.

Figure 21:
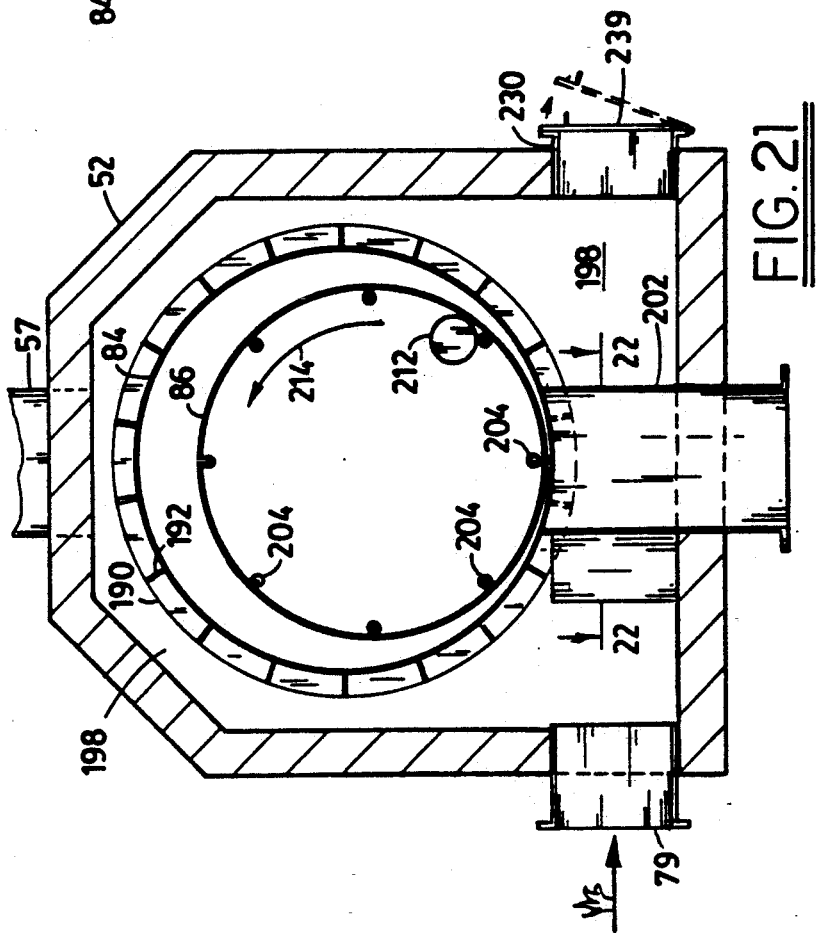
FIG. 21 is a sectional view taken along the line 21—21 in FIG. 20.
Figure 22:
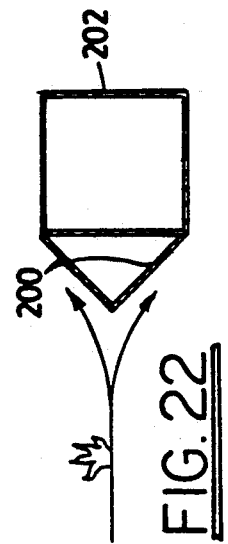
FIG. 22 is a sectional view taken along the line 22—22 in FIG. 21.

Referring to FIGS. 15 and 16, it will be seen that the outer stationary drum 84 has a plurality of longitudinal and circumferential fins 190 and 192. The finned side of the outer drum 84 faces the inside shell 194 of the casing 52 and is connected thereto by brackets 196. The brackets may be welded to the casings. All of the drum and casing internal parts may be stainless steel. An oven chamber 198 is formed between the outer drum 84 and the casing 52 which is heated by the burner 78 (see FIG. 21). As shown in FIGS. 21 and 22, the blast of hot gas is diverted by V-shaped vanes 200 around a section 202 (square in cross section) of the discharge chute which enters through the outer drum 84 into an end region past the discharge end 205 of the converter drum 86.

Figure 20:
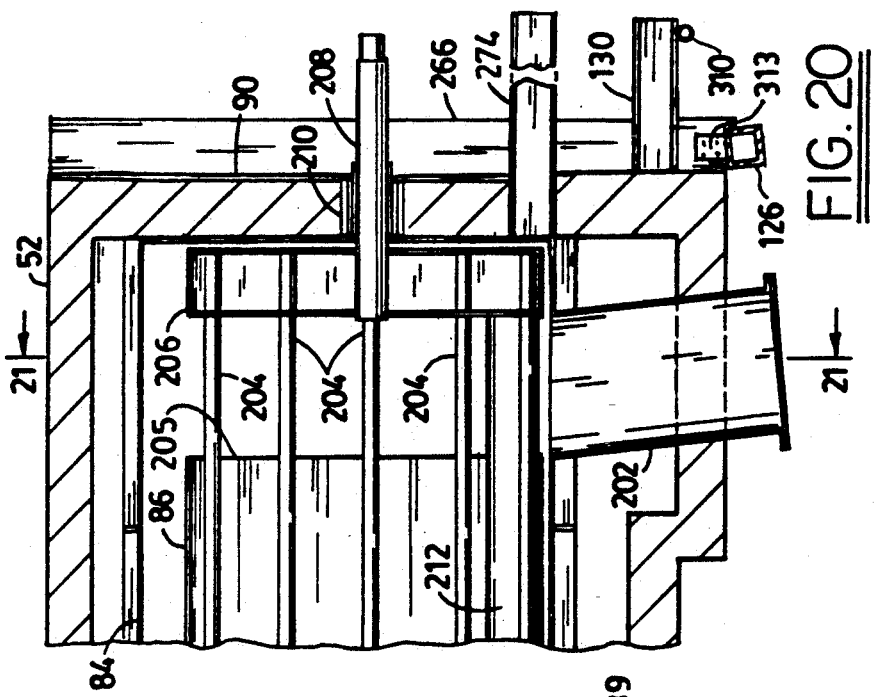
FIG. 20 is a fragmentary sectional view similar to FIG. 15 showing the rear end of the converter and showing the structure for the beams and members which connect to the suspension cables.

As shown in FIG. 20, the converter drum is connected by way of circumferentially spaced rods 204 to a bulkhead 206. This bulkhead has a shaft 208 extending therefrom which is journaled in a water cooled bushing 210 in the discharge end bulkhead 90 of the converter. A crusher rod 212 which is raised and dropped as the converter drum 86 rotates, in the direction shown by the arrow 214 (FIG. 21) assist in crushing and heating solid material which moves downwardly along the inclined (at an angle of approximately 6° to the horizontal) converter drum 86.

The solid products of pyrolyzation (primarily char) and solid particles which have not completely pyrolyzed, drop through the chute 202. The gaseous products of pyrolyzation exit through the outlet end 205 of the converter drum 86 along the gap between the converter drum 86 and the inner drum 84, thereby promoting convective heat transfer to the converter drum from the chamber 198 surrounding the inner drum 84, and then through the discharge pipe 62 which passes through the forward bulkhead 88 into a region at the front or introduction end 207 of the converter drum 86.

A duct 230, which is normally closed, can be opened via a gate 239, to relieve over temperature conditions. When the injection tube 50 is removed, as to the position shown in FIG. 12, the sleeve 144 provides a manway for access into the converter drum 86. There are also a plurality of ducts 309, shown best in FIG. 2 and FIG. 15, which are normally closed by gates which can be opened and torches attached to maintain temperature in the oven chamber and prevent cooling and solidification of the material in the converter drum, should the electrical power fail.

The panels 54 of the outer shell of the casing 52 are connected to the inner shell 194 by Z-shaped struts 240 (See FIGS. 13 and 14). These struts may be welded and define spacers. The space between the struts and throughout the entire casing 52 is desirably filled with insulation, such as basalt rock wool. The outer panels 54 are exposed to the air and may heat to 100°-150° F. Expansion is accommodated by the overlapped or shingled relationship of the longitudinal (vertical) edges 242 and 244. These plates 54 may be of thin ($\frac{1}{8}$ to $\frac{1}{4}$ inch) metal such as stainless steel and are stiffened by the strips 246 which provide a roof and windshield over the overlapping edges thereby diverting rain and protecting against injuries to personnel who might encounter sharp edges thereof. The strips 246 also control any deflections of the underlying panels 54. The strips 246, an exemplary row of panels 54 of the casing 52 and arrows 248 indicating the direction of expansion and contraction of the converter (the longitudinal direction along the axis of the converter) are shown in FIGS. 13 and 14. Fewer panels than shown may be used, and longer shingles or other slipable couplings used.

A scraper mechanism for scraping away residue along the inner periphery of the converter drum 86 is provided by a rod 250 which is cantilevered by a sleeve 252 connecting the rod 250 to the introduction end bulkhead 88 (see FIG. 15 and also FIGS. 16 and 18). This rod extends about two thirds the way from the introduction end 15 towards the rear end 16. The rod 250 has extending therefrom in side by side relationship a series of wire springs 254, which may be bent in hairpin shape using a loop 256 as shown in FIG. 18. At the end of each spring 254 is a scraper plate 258 (see FIG. 19). The scraper plates are disposed end to end as shown in FIG. 15. Each plate has a hole 260 which is larger in diameter than the springs which extend therethrough. The plates are welded to the springs at the holes. The springs 254 are held in a sleeve 255 by end stops 257 and can rotate within the sleeve so as to enable the plates 258 to conform with the inside of the drum 86.

Referring to FIGS. 20 and 23, there is shown the construction of the discharge end of the converter. It is at the discharge end that the mechanism 108 for driving the shaft 208 which rotates the converter drum is disposed. This drive mechanism and the beam 126 and members 130 which are involved in the cable suspension are supported from the bulkhead 90. This bulkhead 90 has a radial array of gussets (much like spokes of a wheel). These gussets are plates extending from a collar 260 around the shaft 208 and spaced radial outward from the journal bushing 210 so as to provide a water jacket through which water is circulated via pipes 262 and 264. The bulkhead is filled with insulation (e.g. rock wool) between the gussets. This structurally rigid bulkhead provides support for the beam 126 and members 130 by way of the pair of vertical riser plates 266 which are disposed parallel to each other on opposite sides of the shaft 208. These plates are welded to the rear wall 268 of the bulkhead 90. A platform thereon 274 which supports the drive mechanism 108 and a roller bearing assembly 276 is attached to the riser plates 266 and between the riser plates 266. The assembly 276 is mounted on a riser 278 which is attached to the platform 274.

The shaft 208 has connected at the end thereof, a sprocket wheel 280 of a sprocket drive assembly. This sprocket wheel is keyed to the shaft 208 and is driven by a motor 282 having a drive sprocket 284 attached to the shaft of the motor. A chain 286 couples the sprockets 280 and 284 and drives the shaft 208; in turn driving the converter drum 86. It may be desirable to provide speed reduction and increased torque, enabling use of smaller motor to use a multiple reduction sprocket transmission between the motor and the shaft 208. The motor may be a variable speed motor to change the rotating speed of the converter drum. A cover 267 extends between the vertical struts 266 and a cover 269 over the sprocket drive assembly.

The shaft 208 is water cooled through a coupling 288 provided by a swivel, sealed by O-rings, and which is stationary while the shaft turns. A bore 290 defines a cooling chamber having an inlet pipe 292 extending to the forward end of the chamber 290. Water is driven through the tube 292 and then circulates back along the bore 290 to an outlet 294 at the swivel 288. Further cooling and sealing of the shaft is provided by a bellows-flange arrangement 298. The forward flange is connected to the stationary bushing 210 and supports the bellows and rear flange of the assembly 298 in stationary position. A water jacket 300 around the shaft 208 in back of the assembly 298 provides a water seal, as well as cools the shaft 208. High temperature "Garlock" type seals are used at both ends of the jacket 288.

Figure 25:
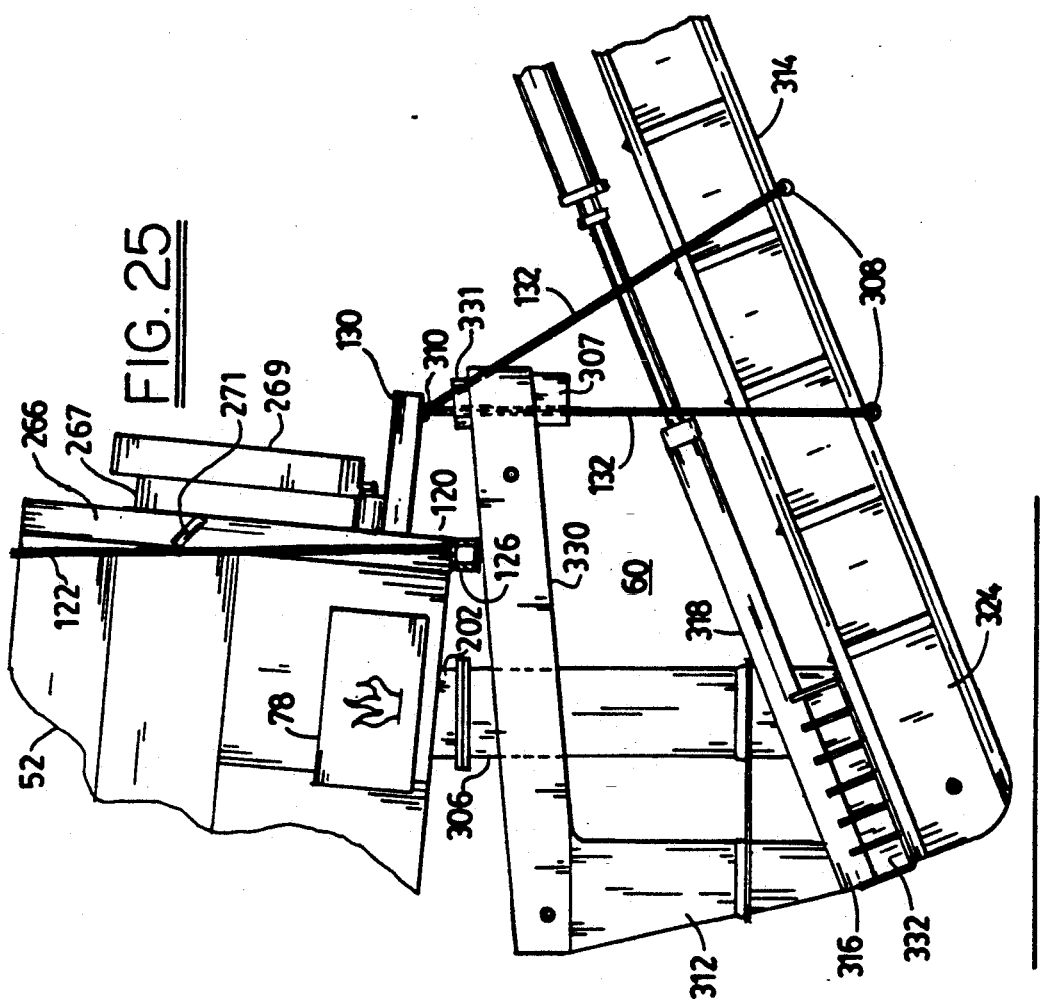
FIG. 25 is an enlarged fragmentary side elevation also showing the collection and separation apparatus and the structure connecting it to the discharge end of the converter.
Figure 24:
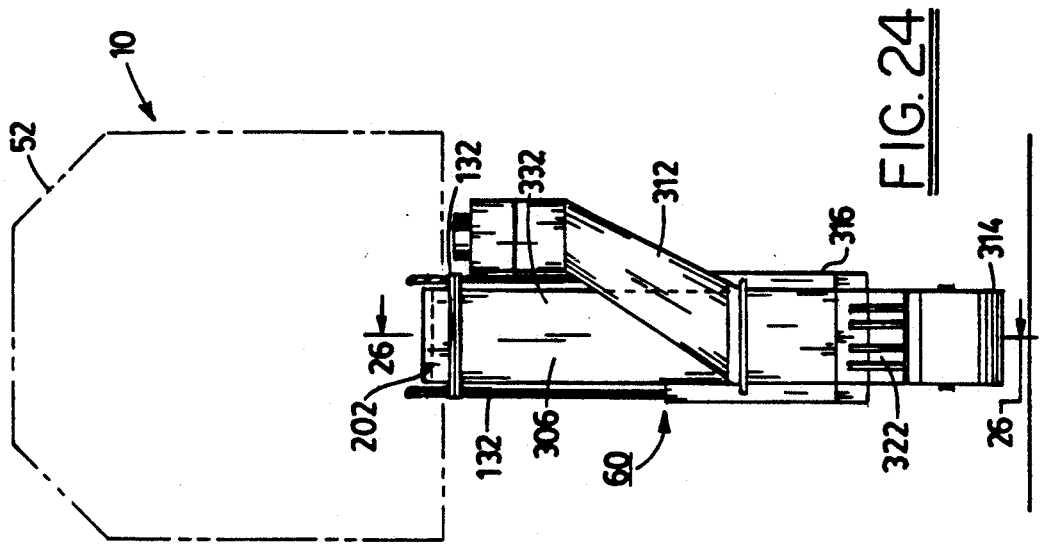
FIG. 24 is an enlarged end view of the apparatus for collecting and separating the solid products discharged from the converter.

Referring to FIGS. 24 through 26, there is shown the solid discharge collecting and separating apparatus 60 which separates the low density (char) from the high density (solid particles) which are discharged at the discharge end of the converter drum 86. The apparatus 60 is connected to the discharge chute section 202 (see FIGS. 20 and 21) which is almost entirely internal of the casing 52. The discharge chute has a lower flange which is connected to an upper flange of the discharge chute 306 of the apparatus 60. There may be some flexure in the discharge chute 306 as the cable suspension 132 pivots with thermal expansion of the collection apparatus 60.

The cables 132 define a cradle, and may be separate cable strands which pass under the apparatus 60 and are connected to rings on the members 130. Alternatively, there may be rings 308 in pairs on opposite sides at the base of the apparatus 60. Separate strands of steel wire cable may be connected to these rings 308 and are threaded through rings 310 which are connected to the hanger members 130.

The apparatus 60 is an assembly of the discharge chute 306, a floatation chute 312 located along side the discharge chute 306, a heavy solids lift and discharge conveyor 314 and a pusher ram unit 316. The pusher ram unit is connected to a housing 318 which defines a channel 320, interconnecting the floatation chute 312 and the discharge chute 306 near the bottom thereof. This connection is provided by a series of struts 322. The discharge conveyor 314 is contained in a housing 324 and extends from below the level of the chutes 306 and 312 to above the level of these chutes as shown in FIGS. 1 and 2 to a discharge point, under which a container for receiving the heavy solid residue particles (not shown) is disposed. The water in the chutes 306 and 312 provides a seal or air lock against the admission of air into the converter.

The conveyor 314 in the housing 324 is a drag conveyor with horizontal flights 328. The solid particles fall between the flight 328 to the bottom of the housing 324 where they are swept by the flights and are delivered to the discharge position at the top of the housing 324.

A housing 330, is connected to the top of the floatation chute 312 and ends along a side 332 off the discharge chute 306. This housing 330 contains another chain drag conveyor 334 having flights 336. The conveyor 334 discharges through the duct 307 connected to the housing 330 at the rear end thereof.

As shown in FIG. 26, the floatation conveyor 312 is substantially filled with water to a level indicated as WL1 (the surface of the water). The discharge conveyor is filled with water; however, the level of the surface of the water in the discharge conveyor 306 (WL2) is below WL1 since the discharge chute is in communication with the converter which is pressurized, for example, from two to four psi above atmospheric pressure. Thus, WL1 is determined by atmospheric pressure and WL2 by the pressure inside the converter 10. The upper (right side) ends of the housings 330 and 324 are open to the atmosphere while the discharge chute 306 is pressurized.

Level Sensors are shown on the chutes 312 and 306 at the requisite water levels, WL1 and WL2 and provide outputs (switch closures) which operate pumps connected to inlet and discharge pipes which circulate cool water to the apparatus 60 to maintain the water levels at WL1 and WL2 and to maintain the water temperature in the apparatus 60 (between 100 F. and 140 F.). The inlet pipe is connected to the chute 312 just below WL1 and the outlet pipe is connected near the upper end of the housing 324. It will be noted that WL1 is at the conveyor 334 so that the flights 336 thereon can skim char (light material) which floats and is more buoyant than the heavy discharge from the pyrolysis process. The other water level WL2 intersects the channel 320. Char, which floats, stays at or below WL2 and is pushed by the ram 340 across the channel 320 into the floatation chute 312. Some solid particles are advanced by the ram 340, but these drop to the bottom of the chutes and are picked up by the flights of the solids discharge conveyor 314. The ram 340 is cyclically actuated (every minute or two) so as to push the buoyant particles into the floatation chamber where they float to the surface WL1, are picked up by the flights 336 of the conveyor 334 and delivered to a discharge position at the end of the conveyor 334 where a container (not shown) may be located. Both solids discharge conveyors may have fans and ducts 331 and 333 (see also FIG. 2) at the high points of their housings to collect any odors and direct them to the burner for destruction.

Referring to FIGS. 27-30, there is shown the condenser and scrubbing system for the gaseous products of pyrolyzation. The three condensing tanks are cylinders which may be five to six feet in height. The upper portion of these tanks have rims which form basins 360 into which water is introduced via pipes 362. The rims of these basins have slots. The water in the basin overflows through these slots along the outsides of the tanks and assists in cooling the tanks. A basin underneath the tanks (for example on the platform on which they are supported) or at ground level, collects the water which flows out of the basins 360.

The tanks operate at different temperatures. The first tank 66, for example, receives hot gas through a pipe 364 which descends approximately 80% of the height of the tank 66. The temperature of the inlet gases may, for example, be 800° F. The gases leaving the tank through a transfer pipe 366 may be at a temperature of about 650° F. The inlet to the transfer pipe 366 is in a chamber 368 with a lip to prevent liquids from leaving with the outgoing gaseous stream and to facilitate condensation of the vapors. Because of the high temperatures of the tank 66, gases which condense in the tank, produce heavy oil, such as tar. This tar may be removed from the tank by piping connected near the bottom thereof as shown at 370.

The transfer pipe 366 is supported by a plate 372 on the top of the second tank 68 and then descends downwardly to almost the bottom of the tank above the position of an agitator 374 which continuously mixes water and sludge collected at the bottom of the tank 68 as the cooling gases condense. The agitation keeps sludge in suspension so that it leaves the tank 68 with the water and can be treated (by conventional separation methods). A support structure 378 internal of the tank which is connected to the transfer pipe 366 and to the support plate 372 enables the transfer pipe and the structure associated therewith to be removed for repair or cleaning, if necessary.

The lower end of the transfer pipe 366 is bent into an elbow 380. The free end of the elbow is tapered to form a nozzle 382. A sleeve 384, having an upper end 386 bent at a 90° angle to the axis of the sleeve, extends over the free end of the elbow and the nozzle 382. The bent end 386 of the sleeve 384 is positioned in alignment with the downwardly descending portion of the transfer pipe 366. Water enters the bottom of the tank 68 through an inlet pipe 388 and leaves through an outlet pipe 390 in a turbulence reducing chamber 392 (see FIG. 29). Turbulent and agitated liquids exist at the bottom of the tank 68. The pressurized gas (due to the above atmospheric pressure in the converter) ascends from the nozzle 382 through the sleeve 384 and forms a negative pressure (below atmospheric pressure) causing the water to lift up the sleeve 384 and spray through the bent section 386 against the transfer pipe 366 thereby precooling the gases flowing there through. Alternatively, water and oil together can be discharged through the outlet pipe 390 and separate thereafter. This action is an air lift accelerated by steam which is formed as the vapors contact the water at the nozzle 382. The action amplifies the turbulent fluids (gas and liquid) and scrubs out the Particles suspended in the gas steam. As the particles are scrubbed, components which are soluble, dissolve in the water so that they may be removed upon subsequent treatment. Such components include metal halides and sulphides which would otherwise be more difficult to remove, because they dissolve readily in the hot turbulent water.

The outlet gases are substantially cooled in the condensing tank 68 and may, for example, be 180° F. when entering a transfer pipe 394 which descends into the third condensing tank 70. The reduced temperature in the tank 68 causes medium oils to condense because of their lower volatility. Such medium oil is collected at an outlet (not shown) above the water outlet 390.

Lighter oils are condensed in the tank 70 where the temperature drops, for example, to 100° F. as measured at the outlet pipe 396. The outlets of each tank are in a chamber 398 and 400 similar to the chamber 368 and which perform a similar liquid diverting and condensation facilitating function. In the last tank 70, light oil collects and water is circulated through an inlet 402 and an outlet 404 in the turbulence reducing chamber 392 thereof. This light oil may be pumped through an upper outlet pipe 406 which enters into the chamber 392.

The gases which are not condensed may go either to the flare tube 80 or to a storage tank where they may be used as a combustible gas in the burner 78 or for other purposes. Agitation is also desirable in the last tank 70 and an agitator 408 is provided at the bottom thereof for such purpose.

The water which is used in the process includes water created in the process upon condensation in the tanks (68 and 70) which are operated below 212° F. This water is desirably processed in a system including a clarifier tank, sand filters and water treatment tanks. Especially clean water may be obtained with a reverse osmosis system. It is desirable to use the water which is processed, but prior to reverse osmosis treatment, internally in the condensing tanks thereof. The cooling water for the seals, jackets, the basins 360 and the like is desirably used after it is cleaned by reverse osmosis. Other purification processes which provide pure water may also be used, but reverse osmosis is presently preferred.

From the foregoing description, it will be apparent that there has been provided an improved pyrolysis converter. Variations and modifications in the herein described converter and in various aspects of its design, in accordance with the invention, will undoubtedly suggest themselves to those skilled in the art. Accordingly, the foregoing description should be taken as illustrative and not in a limiting sense.

I claim:

1. In a pyrolytic converter in which a converter drum is disposed in a chamber in which the drum is journalled for rotation, an improved mechanism for supporting said converter which accommodates thermal expansion when said converter is heated to temperatures sufficient for pyrolyzation of materials introduced into said drum, said mechanism comprising a support member disposed underneath said chamber, a framework resting at ground level including a suspension member disposed above said chamber, means pivotally connecting said chamber to said suspension member for supporting said converter with said chamber on said support member as a fulcrum about which said converter pivots in response to thermal expansion and contraction of said converter.

2. The improvement according to claim 1 were in said converter drum has opposite end regions in the vicinity of which the materials to be pyrolyzed are introduced and pyrolyzed materials are discharged, respectively, said support member being disposed underneath said chamber in the vicinity of one of said opposite end regions, and said suspension member being disposed above said converter in the vicinity of the other of said opposite end regions.

3. The improvement according to claim 2 wherein said one of said end regions is in the vicinity of where said materials are introduced and said other of said end regions is in the vicinity of where said materials are discharged.

4. The improvement according to claim 3 were wherein said converter includes means for handling the material discharged from said drum, and suspension means pivotally connecting said discharge handling means to said chamber and maintaining said discharge handling means above said ground level.

5. The improvement according to claim 3 wherein said converter has discharge handling means disposed at least in part under the end region where said materials are discharged for collecting said material, and suspension means pivotally connecting said chamber to said discharge handling means and also maintaining said discharge handling means above said ground level.

6. The improvement according to claim 5 further comprising a second suspension member projecting longitudinally outwardly from said chamber in the vicinity of the end region where the pyrolyzed materials are discharged, said discharge handling means comprising a first chute depending from said chamber in discharge receiving relationship with said converter drum, at least one conveyor upon which material discharged to said chute is received, said conveyor being disposed beneath said second suspension member and extending in the same direction as said second suspension member, said suspension means comprising a cable connected between said second suspension member and said conveyor.

7. The improvement according to claim 6 further comprising a housing enclosing said conveyor and having a bottom and opposite sides, said cable comprising a plurality of sections defining a cradle extending about said opposite sides and said bottom.

8. The improvement according to claim 6 wherein a housing encloses said conveyor, and said housing is inclined upwardly from said first chute and has lower and upper ends, a second chute extending upwardly from said lower end alongside said first chute, a second conveyor above said lower end and extending into said second chute, said second chute being filled with liquid to present a liquid surface to said second conveyor, said first chute and at least a portion of said housing in the vicinity of said lower end also being filled with liquid, a liquid filled channel above said housing interconnecting said first and second chutes below the surface of said liquid, and a rake reciprocable across said first chute through said channel to said second chute for moving material discharging through said first chute into said second chute for floatation to said surface for engagement by said rake for removal by said second conveyor.

9. The improvement according to claim 3 wherein said framework comprises a first pair of columns resting at said ground level and bridged by a first beam providing said suspension member, a second pair of columns also resting at said ground level and bridged by a second beam providing said support member, said chamber having a bar resting on said second beam and being pivotable thereabout to define, said fulcrum.

10. The improvement according to claim 9 wherein said chamber has connected thereto a support assembly which comprises a pair of generally vertical plates having upper and lower ends, and means connecting said bar to said plates along the lower ends thereof.

11. The improvement according to claim 3 wherein said pivotally connecting and supporting means comprises a pair of cables each connected to said chamber on opposite sides of said chamber.

12. The improvement according to claim 1 comprising a beam extending parallel to said suspension member, said beam being attached to said chamber in said other of said end regions, the cables of said pair of cables being spaced from each other and extending between said suspension member and said beam.

13. The improvement according to claim 12 further comprising means for handling material discharged from said converter drum, said chamber having arm members projecting from said chamber away from said drum and attached to said chamber, and suspension means for suspending said discharge handling means from said chamber, said suspension means including a second cable attached to said arm members, said second cable being disposed inwardly of said cables from said suspension member to said chamber.

14. The improvement according to claim 1 wherein said chamber comprises an outer stationary drum disposed around said converter drum, a casing around said outer drum defining an oven chamber therebetween, said casing having an inner shell and an outer shell, said outer shell extending in a longitudinal direction along the axes of said drums, said outer shell comprising a plurality of plates having edges which extend transversely to said longitudinal direction in overlapping relationship.

15. The improvement according to claim 14 further comprising strips having roof sections and having lips along one edge thereof, said lips being connected to each of said plates adjacent and said roof section projecting over said overlapping edges, said strips stiffening said plates.

16. The improvement according to claim 14 further comprising support members connecting said inner shell to said outer drum, and spacers connecting said plates to said inner shell in spaced relationship therewith, insulating material disposed between said inner and outer shells.

* * * * *